US008849627B2

(12) United States Patent
Vold

(10) Patent No.: US 8,849,627 B2
(45) Date of Patent: *Sep. 30, 2014

(54) COMPUTER SIMULATION OF ELECTROMAGNETIC FIELDS

(71) Applicant: Terje Graham Vold, Anacortes, WA (US)

(72) Inventor: Terje Graham Vold, Anacortes, WA (US)

(73) Assignee: Terje Graham Vold, Anacortes, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,507

(22) Filed: Jun. 10, 2013

(65) Prior Publication Data
US 2013/0275102 A1 Oct. 17, 2013

Related U.S. Application Data

(63) Continuation-in-part of application No. 13/136,010, filed on Jul. 19, 2011.

(60) Provisional application No. 61/365,366, filed on Jul. 19, 2010.

(51) Int. Cl.
*G06F 7/60* (2006.01)
*G06F 17/10* (2006.01)
*G06F 17/50* (2006.01)

(52) U.S. Cl.
CPC ................. *G06F 17/5009* (2013.01); G06F 2217/16 (2013.01)
USPC .......................................................... 703/2

(58) Field of Classification Search
CPC ............ G06F 17/5018; G06F 17/5036; G06F 17/5009; G06F 2217/16; G05B 17/02
USPC ............................................................ 703/2
See application file for complete search history.

(56) References Cited

U.S. PATENT DOCUMENTS 6,516,292 B2 * 2/2003 Yahalom ........................ 703/9
2013/0289955 A1 10/2013 Vold

OTHER PUBLICATIONS

Lagrangian Dynamics of Spinning Particles and Polarized Media in General Relativity Ian Bailey et al. 1975.*
Hestenes, D. (1966). "Space-Time Algebra." Gordon and Breach, Science Publishers, Inc. 93 Pages.
Harrington, Roger F. (1968). "Field Computation by Moment Methods." Robert E. Krieger Publishing Company, Inc.. 229 pages.
Jackson, John David. (1975). "Classical Electrodynamics." John Wiley & Sons Inc., 848 pages.
Bailey, Ian et al. (1975). "Lagrangian Dynamics of Spinning Particles and Polarized Media in General Relativity." Commun. math Phys. 42, 65-82 Springer-Verlag.
Vold, Terje G. (1993). "An introduction to geometric calculus and with an application in rigid body mechanics." American Association of Physics Teachers American Journal of Physics, 61(6), Jun. 1993. pp. 491-504.

(Continued)

*Primary Examiner* — Saif Alhija
(74) *Attorney, Agent, or Firm* — David Lewis

(57) ABSTRACT

A method and system is provided for solving for electromagnetic fields by approximating an electromagnetic function as a sum of basis functions multiplied by coefficients to be determined. The set of equations used to determine the coefficients results from taking derivatives of the action integral with respect to the coefficients (and/or other parameters) and setting the derivative equal to zero, thereby extremizing the action integral.

19 Claims, 10 Drawing Sheets

(56) References Cited

OTHER PUBLICATIONS

Vold, Terje G. (1993). "An introduction to geometric calculus and its application to electrodynamics." American Association of Physics Teachers American Journal of Physics, 61(6), Jun. 1993. pp. 505-513.

Jin, Jian-Ming. (2002). "The Finite Element Method in Electromagnetics." 2nd Edition, John Wiley & Sons Inc. 753 pages.

Doran, Chris et al. (2003). "Geometric Algebra for Physicists." Cambridge University Press, 2003. 589 pages.

Gibson, Walton C. (2008). "The Method of Moments in Electromagnetics." Chapman & Hall / CRC. Taylor and Francis Group. 272 Pages.

Vold, Terje G. (Sep. 17, 2013) "Computing Electromagnetic Fields by the Method of Least Action." Advances in Applied Clifford Algebras. 2013, Springer Basel. DOI 10.1007/s00006-013-0417-1. 19 Pages.

(Unpublished Patent Application) U.S. Appl. No. 14/261,415; Inventor: Vold, Terje Graham filed Apr. 24, 2014 Title: Computer Simulation of Electromagnetic Fields.

(Unpublished Patent Application) U.S. Appl. No. 13/136,010; Inventor: Vold, Terje Graham filed Jul. 19, 2011 Title: Computer Simulation of Electromagnetic Fields.

(Unpublished P.C.T. Application) Serial No. PCT/US14/41805; Inventor: Vold, Terje Graham Filing Date: Jun. 10, 2014 Title: Computer Simulation of Electromagnetic Fields.

* cited by examiner

COMPUTER SIMULATION OF ELECTROMAGNETIC FIELDS

CROSS-REFERENCE TO RELATED APPLICATIONS

This application is a continuation-in-part of U.S. patent application Ser. No. 13/136,010, entitled "Computer simulation of electromagnetic fields," filed Jul. 19, 2011, which claims priority to U.S. Provisional Patent Application No. 61/365,366, entitled "Improved Computer Simulation of Electromagnetic Field," filed Jul. 19, 2010, by Terje Vold, which are both incorporated herein by reference.

FIELD

This specification generally relates to computations of electromagnetic fields.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. There are a variety of numerical techniques for computing numerical fields. Boundary element methods are often used in electromagnetic simulations. The general idea is that space is modeled as consisting of regions with uniform electromagnetic response properties separated by negligibly thin boundaries. For each uniform region, a parameterized solution to Maxwell's equations is written (for example, a sum of parameters times plane waves, or a sum of parameters times fields due to fictitious "equivalent sources"). The parameterization and the parameters are chosen so that the error is small in some sense.

However, the best method for minimizing the errors is not at all obvious. A common method is the "method of moments." However, the method of moments is rather poorly motivated and ad-hoc. Different choices of parameters are chosen for different (and rather poor) notions of "error" and "small" for different situations. In other words, the choice of parameterization and parameters is an art form that depends on the user's intuition.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1, 2, 5-11 is a brief description of each element, which may have no more than the name of each of the elements in the one of FIGS. 1, 2, 5-11 that is being discussed. After the brief description of each element, each element is further discussed in numerical order. In general, each of FIGS. 1-11 is discussed in numerical order and the elements within FIGS. 1-11 are also usually discussed in numerical order to facilitate easily locating the discussion of a particular element. Nonetheless, there is no one location where all of the information of any element of FIGS. 1-11 is necessarily located. Unique information about any particular element or any other aspect of any of FIGS. 1-11 may be found in, or implied by, any part of the specification.

System

Figure 1:
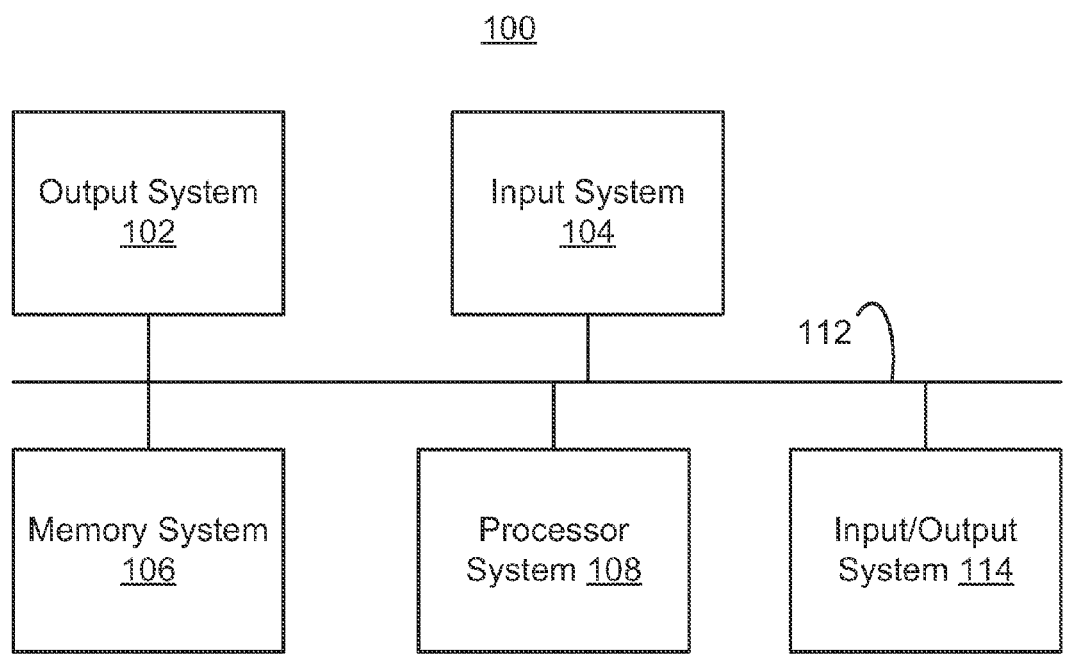
FIG. 1 shows a block diagram of a machine that may be used for carrying out the computations for determining electromagnetic fields.

FIG. 1 shows a block diagram of a machine 100 that may be used for carrying out the computations for determining electromagnetic fields. Machine 100 may include output system 102, input system 104, memory system 106, processor system 108, communications system 112, and input/output device 114. In other embodiments, machine 100 may include additional components and/or may not include all of the components listed above.

Machine 100 is an example of what may be used for carrying out the computations for determining electromagnetic fields. Machine 100 may be a computer and/or a spatial purpose machine computing electromagnetic computations.

Output system 102 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example. Output system 102 may be used to display indication the types of input needed, whether there are any issues with the inputs received, and output results of a computation of an electromagnetic field, for example.

Input system 104 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example. Input system 104 may be used to enter the problem parameters, such as the grid on which to perform the computations, the material parameters of each region within the grid, choose basis functions, and initial state, if applicable.

Memory system 106 may include, for example, any one of, some of, any combination of, or all of a long term storage system, such as a hard drive; a short term storage system, such as random access memory; a removable storage system, such as a floppy drive or a removable drive; and/or flash memory. Memory system 106 may include one or more machine-readable mediums that may store a variety of different types of information. The term machine-readable medium is used to refer to any non-transient medium capable carrying information that is readable by a machine. One example of a machine-readable medium is a computer-readable medium. Memory system 106 may store the machine instructions (e.g., a computer program, which may be referred to as a code) that cause machine 100 to compute electromagnetic field computations. Memory 106 may also store material parameters corresponding to specific materials and basis-functions. The basis function may be parameterized solutions to the electromagnetic equations within a homogenous region.

Processor system 108 may include any one of, some of, any combination of, or all of multiple parallel processors, a single processor, a system of processors having one or more central processors and/or one or more spatialized processors dedicated to specific tasks. Processor system 110 may carry out the machine instructions stored in memory system 108, and compute the electromagnetic field.

Communications system 112 communicatively links output system 102, input system 104, memory system 106, processor system 108, and/or input/output system 114 to each other. Communications system 112 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 114 may include devices that have the dual function as input and output devices. For example, input/output system 114 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 114 is optional, and may be used in addition to or in place of output system 102 and/or input device 104.

Figure 2:
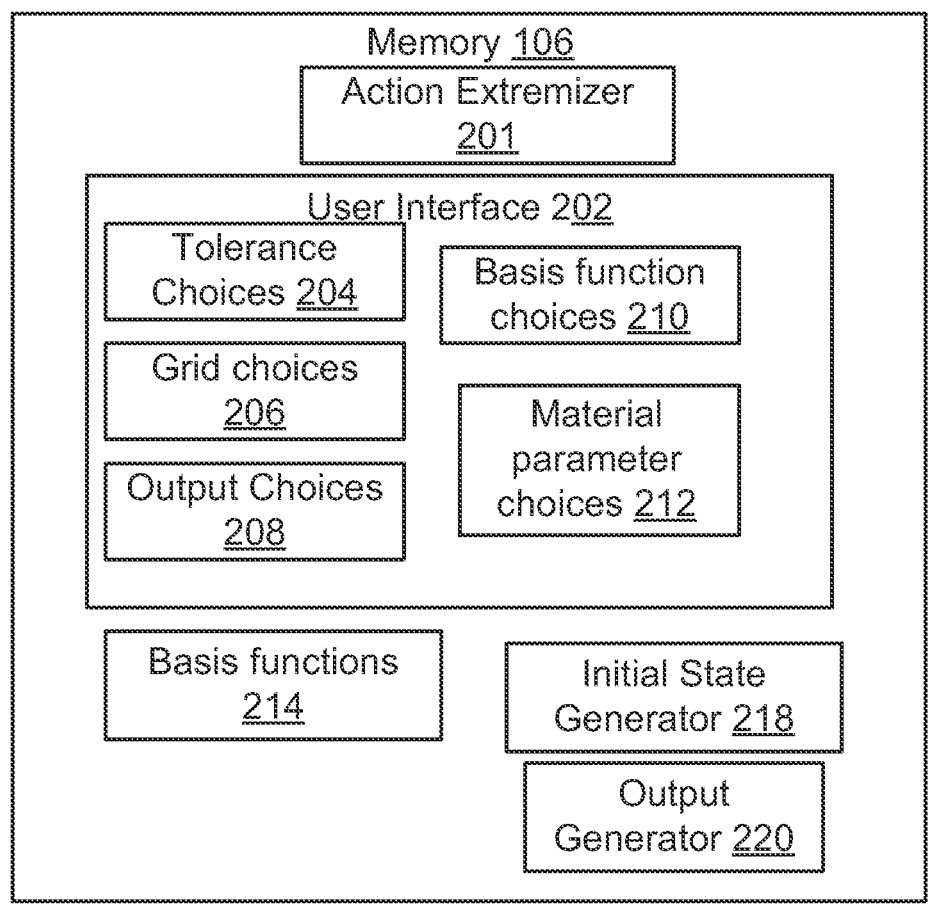
FIG. 2 is a block diagram of an example of system, which may store the machine code for solving for electromagnetic fields.

FIG. 2 is a block diagram of an example of system 200, which may store the machine code for solving for electromagnetic fields. System 200 may include action extremizer 201 and user interface 202 having tolerance choices 204, grid choices 206, output choices 208, basis function choices 210, and paterial parameter choices 212. Memory 106 may also include basis functions 214, initial state generator 218, and out put generator 220. In other embodiments, system 200 may include additional components and/or may not include all of the components listed above.

In an embodiment, system 200 is an embodiment of memory system 106, and the blocks of system 200 represent different functions of the code that solves for electromagnetic fields performs, which may be different modules, units and/or portions of the code. Alternatively, system 200 may be a portion of the processor system, such as an Application Specific Integrated Circuit (ASIC), and/or another piece of hardware in which the code of system 200 is hardwired into system 100.

An Embodiment for Stationary Homogeneous Polarizable Regions

Continuing the discussion of FIG. 2 from above, action extremizer 201 solves electromagnetic equations by extremizing the action. Briefly, as one example of how action extremizer 201 may work, cases when all of 3D space is modeled as consisting of volumes or regions of space are considered, each filled with stationary homogenous polarizable material with optionally different polarizabilities for different regions, with boundaries of negligible thickness between these regions. For example, air, plastic, glass, water, copper, and most other materials that appear uniform have homogenous polarizability.

The classical electromagnetic action for linear media, using standard complex scalar and 3D vector algebra and calculus to represent fields varying harmonically according to a factor $e^{-i\omega t}$ at frequency $\omega$, may be written as $$S = \int \left( \frac{1}{2}(E^* \cdot D - B^* \cdot H) - (\Phi^* \rho - A^* \cdot J) \right) dV,$$

here E is the electric field, D is the displacement field, H is the magnetic intensity, B is the magnetic field, $\Phi$ is the electric scalar potential, $\rho$ is the charge density, A is the vector potential, and J is the current density. The integration is over the entire volume. The scalar and vector potentials are parameterized as sums $\Phi = \Sigma_j \phi_j c_j$ and $A = \Sigma_j a_j c_j$ over basis potentials $\phi_j$ and $a_j$ that are effectively continuous (i.e., a gauge transformation exists resulting in continuous scalar and vector potentials) at all points including boundary points times parameters $c_j$, the electric field and magnetic intensity as sums $E = \Sigma_j e_j c_j$ and $B = \Sigma_j b_j c_j$ over basis fields given by $e_j = -\nabla \phi_j - (1/c)(-i\omega)a_j$ and $b_j = \nabla \times a_j$ times the same parameters $c_j$, and the electric displacement and magnetic field as sums $D = \Sigma_j d_j c_j$ and $H = \Sigma_j h_j c_j$ over basis fields, which in a linearly responsive material with permittivity E and permeability pt are given by $d_j = \in e_j$ and $h_j = (1/\mu) b_j$, times the same parameters $c_j$. Note that once potential basis potential functions $\phi_j$ and $a_j$ are chosen, the electromagnetic field basis functions $e_j$, $b_j$, $d_j$, and $h_j$ are determined since the electromagnetic field basis functions are defined by the potentials. The basis functions may be chosen so that the solution satisfies the Euler-Lagrange equations (i.e., the two inhomogeneous Maxwell equations when written using conventional vector algebra) at all non-boundary points of each volume of homogenous material for any set of parameter values, in which case the integrand of the variation of the action S is zero at these points, as shown in a later section. Choosing the basis functions so that the solution satisfies the Euler-Lagrange equations at all non-boundary points generally simplifies calculations, but is not necessary. At the boundary, Maxwell's equations imply that $\sigma = \hat{n} \cdot \nabla D$ and $K = \hat{n} \times \Delta H$ where $\sigma$ is any 2D electric charge density and K is any 2D electric current density on the boundary. However, when solving for the electromagnetic fields, $\sigma=\hat{n}\cdot\Delta D$ and $K=\hat{n}\times\Delta H$ are not expressly required. Rather, extremizing the action will result in a solution that satisfies Maxwell's equations and therefore satisfy, $\sigma=\hat{n}\cdot\Delta D$ and $K=\hat{n}\times\Delta H$. It is often convenient to let the j=0 terms be terms from fields that are applied or that are due to known or specified charge and current sources, with $c_0=1$, and to let the j≠0 terms have parameters $c_j$ that are determined by the methods disclosed herein, which is generally the convention that is followed here.

The above parameterized potentials ($e_j=\nabla\phi_j-(1/c)(-i\omega)a_j$ and $b_j=\nabla\times a_j$) and fields ($D=\Sigma_j d_j c_j$, $H=\Sigma_j h_j c_j$, $d_j=\in e_j$, and $h_j=(1/\mu)b_j$) are plugged into the action S, and the action S is extremized with respect to variation of the parameters $c_i$. The extremization of the action requires that $$\frac{\partial s_i}{\partial c_i}=0$$

for all i≠0. For stationary media and basis functions chosen so that the fields always satisfy the Euler-Lagrange equations at non-boundary points, requiring $$\frac{\partial s_i}{\partial c_i}=0$$

for all i≠0 implies the following set of equations, indexed by i≠0:

$\Sigma_{j\neq 0}\int(\phi_i^*\hat{n}\cdot\Delta d_j-a_i^*\cdot\hat{n}\times\Delta h_j)dn\ c_j=\int(\phi_i^*(\hat{n}\cdot\Delta d_0-\sigma)-a_i^*\cdot(\hat{n}\times\Delta h_0-Kdn\ c0,$ where j is summed over all values for which j≠0, the various indexed quantities $\Phi_i$, $d_j$, $a_i$, and $h_j$ represent basis functions for the scalar potential, electric displacement field, vector potential, and magnetic intensity field, respectively, as stated above, Δ means "change across the boundary", σ and K are known or specified surface charge density and surface current density on the boundary, respectively (if any exist), $d_0$ and $h_0$ are the known, specified, or applied displacement field and input magnetic intensity fields, respectively (if there are any), and the integrals are over all 2D boundaries between volumes of material with homogeneous polarizability, where do is a 2D boundary area element and $\hat{n}$ is a unit vector perpendicular to the boundary. If i≠0 ranges over Q values, then the equations resulting from varying the parameters of the action are a set of Q equations in Q unknowns, the Q unknowns being the parameters $c_i$. This set of equations resulting from varying the parameters of the action may be solved as a set of linear equations to find the values of the parameters.

Choosing parameterized fields by requiring effectively continuous potentials and choosing parameters to extremize the action is the central idea of this invention, and provides an improved way to choose parameterized fields and thereby to compute the solutions.

In some embodiments, the scalar and vector potentials are effectively continuous at all points including boundary points. In this specification, a scalar potential and a vector potential are said to be effectively continuous if, for some scalar field $\psi$, the vector potential plus $\nabla\psi$ is continuous and the scalar potential plus $$\frac{\partial}{\partial t}\psi$$

is continuous. Alternatively, the value of the potential on one side of a boundary effectively equals the value on the other side. The term effectively continuous is also defined below using fields in space-time and geometric algebra. A potential may also be said to be effectively discontinuous if it is not effectively continuous.

In this embodiment, the basis functions may be chosen in various ways, as long as the basis functions are such that the solution satisfies the Euler-Lagrange equations for the action within each region with homogeneous polarizability for any choice of parameter values. The boundary conditions may be chosen to be physically significant. For example, each basis function might be a plane wave for a finite bounded source-free region, but for an infinite region without distant sources, another choice of basis function may be chosen instead of plane waves.

In an embodiment, either of these requirements (effective continuity or satisfaction of the Euler-Lagrange equations) may be satisfied exactly or within a numerical approximation (or stated differently either condition may be satisfied within a tolerance).

Each potential basis function is uniquely determined at all points by its specification at all boundary points, if it is required to satisfy the Euler-Lagrange equations at non-boundary points. There are various ways to define and calculate basis functions that satisfy the Euler Lagrange equations at nonboundary points based on the boundary points. Two methods—the use of virtual sources and approximate solutions to the Euler-Lagrange equations—are detailed in later sections.

In this specification the potential is said to be conserved according to the usual definition: that its 4D space-time divergence equals zero, $\nabla\cdot A=0$, which is equivalent to the usual definition for the corresponding time-dependent quantities in 3D space, $(1/c)\partial_t\Phi+\nabla\cdot A=0$. To say that a potential is conserved is synonymous with saying that it satisfies the Lorenz condition.

In general throughout this specification, whenever two quantities are said to be equal, in an embodiment those two quantities may differ from one another by no more than an accepted tolerance.

Each potential and field may be parameterized as a sum of parameters $c_i$ times corresponding basis functions. The parameterization of the potential at boundary points may be constrained by additional requirements, such as a specified total charge enclosed by the boundary. In an embodiment, the computations are computed while constrained to satisfy the Lorenz condition to simplify the numerical computations. In other embodiments, other gauges may be chosen.

To summarize, in an embodiment, action extremizer 201 solves the set of equations indexed by i for i≠0

$\Sigma_{j\neq 0}\int(\phi_i^*\hat{n}\cdot\Delta d_j-a_i^*\cdot\hat{n}\times\Delta h_j)dn\ c_j=-\int(\phi_i^*(\hat{n}\cdot\Delta d_0-\sigma)-a_i^*\cdot(\hat{n}\times\Delta h_0-K))dn\ c_0$ for the unknown parameters, $c_j$, indexed by j for j≠0.

In the above equation, $d_0$ and $h_0$ are the input displacement and magnetic intensity basis fields associated with the input potential basis functions $\phi_0$ and $a_0$, and $c_0$ is the input coefficient that $d_0$ and $h_0$ are multiplied by to get the input portion of the field, typically chosen as $c_0=1$.

To further elaborate on how to evaluate $\phi_i$, $a_i$, $d_j$, and $h_j$ in the above integral, using the index I for one homogeneous region on one side of a boundary and the index II on the other side of the boundary. The scalar and vector potentials and the electric displacement and magnetic fields in regions I and II would be calculated using the expressions:

$\Phi_I = \Sigma_j c_j \phi_{Ij}$, $\Phi_{II} = \Sigma_j c_j \phi_{IIj}$, $A_I = \Sigma_j c_j a_{Ij}$, $A_{II} = \Sigma_j c_j a_{IIj}$, $D_I = \Sigma_j c_j d_{Ij}$, $D_{II} = \Sigma_j c_j d_{IIj}$, $H_I = \Sigma_j c_j h_{Ij}$, and $H_{II} = \Sigma_j c_j h_{IIj}$.

The basis potentials $\phi_j$ and $a_j$ are required to be continuous at the boundary, so even though the expressions giving $\phi_{Ij}$ and $a_{Ij}$ may be different from those for $\phi_{IIj}$ and $a_{IIj}$, they are chosen to have equal values at boundary points, and so values at the boundary may be computed using either expressions $\phi_{Ij}$ and $a_{Ij}$, or $\phi_{IIj}$ and $a_{IIj}$; but space derivatives of these potentials are not generally continuous across the boundary, so changes $\Delta d_j$ and $\Delta h_j$ across the boundary are equal to differences between expressions for the fields on the two sides:

$\Delta d_j = d_{Ij} - d_{IIj}$ $\Delta h_j = h_{Ij} - h_{IIj}$

In practical computations, electromagnetic field values $d_j$ and $h_j$ may be calculated by any of various methods: we might have symbolic expressions for potentials, from which numerical values may be calculated at nearby points in space and used to approximate the derivatives $$d_{Xj} = -\varepsilon_X \left( \nabla \phi_{Xj} + \frac{\partial}{\partial t} a_{Xj} \right) \text{ and } h_{Xj} = \frac{1}{\mu_X} \nabla \times a_{Xj}$$

as differences, for X equal to I or II; or symbolic expressions for both the potential fields and electromagnetic fields might be found as integrals of Green's functions using the same physical or virtual charge-current source; or other methods may be used.

A More General Embodiment

More generally, action extremizer 201 is a module that solves for the electromagnetic fields by extremizing the action. In general, action extremizer 201 computes numerical values for a set of parameters of basis functions (e.g., the vector and scalar potentials from which the electric and magnetic fields may be derived). In an embodiment, the potential functions are a parameterized, effectively continuous electromagnetic potential. The values of the parameters are computed within a predetermined tolerance to extremize an action integral. The action integral is the integral of the Lagrangian density. The Lagrangian density contains terms for the electromagnetic field in vacuum or in polarizable media and for the interaction of the electromagnetic field with electric charge and current. Terms may describe linear or nonlinear polarizable media.

Generally the notation and nomenclature of Doran and Lasenby, *Geometric Algebra for Physicists*, Cambridge University Press, 2003, is used, and also the convention of Mathematica from Wolfram Research that expressions are grouped by rounded brackets (parentheses) while function arguments are enclosed by square brackets is used (although function arguments may be implied or written explicitly, so that, for example, we might write the action as either S or S[A, $\nabla$A]).

More generally, the action integral S equals the integral of the Lagrangian density over space-time $\Omega$ with differential $d\Omega$. Using the geometric algebra of 4D space-time, this can be written, at least if the medium has linear electric and magnetic polarizability at all points, as $$S = \int \left( \frac{1}{2} F \cdot G - A \cdot J \right) d\Omega,$$

where A is an effectively continuous space-time vector potential field, $F = \nabla \wedge A$ represents the electric field E and magnetic intensity B where $\nabla$ is the 4D vector derivative operator in the geometric algebra of space-time, G is a function of F that represents the displacement field D and magnetic field H, the operator "·" is the generalization in geometric algebra of the dot product, which in this case equals a multiplication of the scalar portions minus a vector dot product of the 3D vector portions plus a vector dot product of the 3D pseudovector portions of the variables in question, J is the space-time vector field representing all charge and current density that is not incorporated in G, and $d\Omega$ is the integration differential. Note that 4D space-time vector quantities are always represented by non-bold symbols such as $\nabla$ and A, while 3D space vector quantities are always represented by bold symbols such as $\nabla$ and A, usually using the same symbol if they are relative vectors, such as $A = \mathbf{A} \wedge \gamma_0$ and $\nabla = \boldsymbol{\nabla} \wedge \gamma_0$ where $\gamma_0$ is the space-time velocity 4-vector of the inertial frame associated with the 3D space vector quantities.

A space-time vector field such as A is called effectively continuous if $A + \nabla \chi$ is continuous, for some scalar field $\chi$ satisfying $\nabla^2 \chi = 0$. This is identical to the definition of effective continuity for the corresponding 3D space vector and scalar fields.

The method of least action may be expressed as the variation of a volume integral being equal to zero. The method involves solving the set of equations that results from setting to zero the variation $\delta S$ of the action S with respect to any variation of the potential field A, $\delta S = 0$ where variation of a function of A and its derivatives $\nabla A$, such as the action S[A,$\nabla$A], with respect to A, has the usual definition of $\delta S[A, \nabla A] = (\partial_\in S[A + \in A', \nabla(A + \in A')])_{\in = 0}$ for some field A', and setting this variation to zero for any variation of A means that this equals zero for any choice of A'. Note that if S[A,$\nabla$A] equals A—that is, S[A,$\nabla$A]$\equiv$A—this definition says that $\delta$A is equal to A', and so we may write either $\delta$A or A' interchangeably.

In the general abstract case treated in textbooks (such as Doran and Lasenby), at least for G being a linear function of F and assuming that quantities approach zero sufficiently rapidly at large distances, we can integrate the first term of $\delta S$ by parts to get $\int \delta A \cdot (\nabla \cdot G - J) d\Omega = 0$ This is true for any variation $\delta$A of the potential A if the Euler-Lagrange equation $\nabla \cdot G - J = 0$ is satisfied at all points. The Euler-Lagrange equation is equivalent to the two inhomogeneous equations of Maxwell (i.e., those with charge and current terms) as normally written using 3D vector algebra, while the two homogeneous equations of Maxwell are equivalent to $\nabla \wedge F=0$ which follows as a mathematical identity because of the definition $F=\nabla \wedge A$.

If the potential A is continuous everywhere, but for some points its derivatives are not continuous and therefore the electromagnetic fields F and G are not continuous, such as generally occurs at boundaries between regions with different polarizabilities, we must treat these points more carefully. We do this in the usual way, with the result that the integral equation above is replaced by $$\int \delta A \cdot (\nabla \cdot G - J) dv + \int \delta A \cdot (\eta \cdot \Delta G - K) d\eta = 0$$

where the first integral is over 4D space-time volume made up of all non-boundary points, with differential dv, the second integral is over 3D surfaces made up of all boundary points in 4D space-time, with differential $d\eta$ and perpendicular unit space-time vector $\eta$, and $\Delta G$ represents the change in G from one side of the boundary to the other in the direction of the unit vector $\eta$. We call $\nabla \cdot G - J = 0$ the Euler-Lagrange equation and $\eta \cdot \Delta G - K = 0$ the "boundary Euler-Lagrange equation."

In this invention, we apply the theoretical results above to numerical computations in a useful way not done before: we restrict A to be a function of parameters $c_j$ so that the only allowed variations $\delta A$ of A are those resulting from variation of these parameters. It is convenient to write $A = \Sigma_j a_j c_j$ where the $a_i$ are potential basis functions, in which case a possible variation A' in the definition of variation above is constrained to be any one of the $a_j$ and so $\delta A$ may equal any one of these basis functions $a_i$. The last equation above is then replaced by $$\int a_i \cdot (\nabla \cdot G - J) dv + \int a_i \cdot (\eta \cdot \Delta G - K) d\eta = 0.$$

One or more parameters $c_j$ may be known and the others unknown and to be found by the method of this invention; for simplicity, we here assume that the i=0 parameter, $c_0$, is known and equal to 1 and all others are unknown. We expand F as a corresponding sum of basis functions, $F = \Sigma_i f_i c_i$ where $f_i = \nabla \wedge a_i$ is the associated basis function of F. We also assume that G is a linear function of F in which case we may expand $G = \Sigma_i g_i c_i$ where each $g_i$ is a linear function of $f_i$ that gives the associated basis function for G. The same parameters $c_j$ are used for A, F, and G.

It may be convenient to rearrange the resulting equation so that terms that have a factor equal to one of the unknown parameters, $c_j$ for $j \neq 0$ in this example, are all on the left, and all other terms are on the right:

$$\sum_{j \neq 0} \left( \int a_i \cdot (\nabla \cdot g_j) dv + \int a_i \cdot (\eta \cdot \Delta g_j) d\eta \right) c_j =$$
$$- \int a_i \cdot (\nabla \cdot g_0 - J) dv - \int a_i \cdot (\eta \cdot \Delta g_0 - K) d\eta$$

This is now manifestly a matrix equation, convenient for numerical computations on a computer, of the form $$M \cdot C = B$$

where M is a matrix with elements $m_{i,j}$, for indices $i \neq 0$ and $j \neq 0$, given by the expression in the outermost parenthesis on the left, $$m_{i,j} = \int a_i \cdot (\nabla \cdot g_j) dv + \int a_i \cdot (\eta \cdot \Delta g_j) d\eta$$

C is an array with elements equal to the unknowns $c_j$ for $j \neq 0$, and B is an array made up of expressions $b_i$, for indices $i \neq 0$, given by the right side of the equation, $$b_i = -\int a_i \cdot (\nabla \cdot g_0 - J) dv - \int a_i \cdot (\eta \cdot \Delta g_0 - K) d\eta$$

In an embodiment, the basis functions $a_i$ are chosen so that for any set of parameter values, the potential A satisfies the Euler-Lagrange equation at all non-boundary points, exactly or to an approximation that is within an accepted tolerance, so that the integrals over the 4D space-time volumes (i.e., integrals with differential dv) in both M and B may be ignored. In this case, the matrix equation $M \cdot C = B$ is again solved for the parameters but the interior volume integrals will be equal to zero or may be approximated by zero so that the matrix M and array B have elements $$m_{i,j} = \int a_i \cdot (\eta \cdot \Delta g_j) d\eta$$

$$b_i = -\int a_i \cdot (\eta \cdot \Delta g_0 - K) d\eta$$

In other embodiments, some but not all of the volume integrals may be zero or negligible.

A More General Embodiment Written Using Vector Algebra

All expressions above, which are written using geometric algebra, may be alternatively written using the notation of conventional vector algebra, as outlined, for example, in Doran and Lasenby.

For example, if in some inertial frame characterized by the unit space-time time-like vector $\gamma_0$ all media are stationary, the matrix elements $m_{i,j}$ can be rewritten using familiar scalar and 3D vector quantities defined in the 3D space of the inertial frame as $$m_{i,j} = \int (\phi_i (\nabla \cdot d_j) - a_i \cdot (\nabla \times h_j - \partial_t d_j)) dV \, dt + \int (\Phi_i (\hat{n} \cdot \Delta d_j) - a_i \cdot (\hat{n} \times \Delta h_j)) dn \, dt$$

and the array elements $b_i$ as $$b_i = -\int (\phi_i (\nabla \cdot d_0 - \rho) - a_i \cdot (\nabla \times h_0 - \partial_t d_0 - J)) dV \, dt - \int (\phi_i (\hat{n} \cdot \Delta d_0 - \sigma) - a_i \cdot (\hat{n} \times \Delta h_0 - K)) dn \, dt$$

where the 4D space-time quantities used by geometric algebra are related to 3D space quantities used by vector algebra by $$a_i = \gamma_0 \left( \varepsilon_0 \phi_i - \frac{1}{c \mu_0} a_i \right)$$

$$\nabla = \left( \frac{1}{c} \frac{\partial}{\partial t} - \nabla \right) \gamma_0$$

$$g_i = d_i + \frac{1}{c} III h_i$$

$$\eta = n \gamma_0$$

$$J = \gamma_0 \left( \rho - \frac{1}{c} J \right)$$

$$K = \gamma_0 \left( \sigma - \frac{1}{c} K \right)$$

If, further, all fields have harmonic time dependence, then complex-valued fields may be used (for example, the physical value of a 3D vector basis potential represented by the complex vector valued field $a_i$ is equal to $\text{Re}[a_i \exp[-i\omega t]]$), with complex conjugation indicated by a superscript asterisk. The action is integrated over time and renormalize by an associated constant factor. The matrix elements $m_{i,j}$ may then be written as $$m_{i,j} = \int (\phi_i^* (\nabla \cdot d_j) - a_i^* \cdot (\nabla \times h_j + i \omega d_j)) dV + \int (\phi_i^* (\hat{n} \cdot \Delta d_j) - a_i^* \cdot (\hat{x} \times \Delta h_j)) dn$$

and the array elements $b_i$ may be written as $$b_i = -\int (\phi_i^* (\nabla \cdot d_0 - \rho) - a_i^* \cdot (\nabla \times h_0 + i \omega d_0 - J)) dV - \int (\phi_i^* (\hat{n} \cdot \Delta d_0 - \sigma) - a_i^* \cdot (\hat{n} \times \Delta h_0 - K)) dn$$

If the basis functions have been chosen so that the Euler-Lagrange equations are satisfied for any choice of parameter values at all non-boundary points, then the volume integrals are again equal to zero. For example, in this case of harmonic time dependence of fields and stationary boundaries, the last expressions for the matrix and array elements simplify to $$m_{i,j} = \int (\phi_i^* (\hat{n} \cdot \Delta d_j) - a_i^* \cdot (\hat{n} \times \Delta h_j)) dn$$

and $$b_i = -\int (\phi_i^* (\hat{n} \cdot \Delta d_0 - \sigma) - a_i^* \cdot (\hat{n} \times \Delta h_0 - K)) dn.$$

These last expressions for matrix and array elements represent an especially simple and useful embodiment of the method of least action.

Least action extremizer 201 may solve the matrix equation M·C=B with matrix elements given by any of the expressions of this or the previous section, or another form of the set of equations obtained by taking the derivatives with respect to the parameters of the action integral and setting the derivatives of the action with respect to the parameters equal to zero.

Notation

The notation of Doran and Lasenby in SI units is used below. For reference some further details of this notation are given here.

A frame vector of 4D space-time is represented by $\gamma_\alpha$ for $\alpha \in \{0, 1, 2, 3\}$, with $\gamma_0$ equal to the time-like frame vector and with $\gamma_0 \gamma_0 = 1$. A frame vector of the 3D space of the inertial frame associated with $\gamma_0$ is represented by $e_i \equiv \gamma_i \gamma_0$ for $i \in \{1, 2, 3\}$. The electromagnetic field F is defined to equal the antisymmetric space-time vector derivative of the space-time vector potential A, $$F = \nabla \wedge A,$$

where $$\nabla = \left(\frac{1}{c} \frac{\partial}{\partial t} - \nabla\right) \gamma_0$$

is the space-time vector derivative, $$A = \gamma_0 \left(\varepsilon_0 \Phi - \frac{1}{c \mu_0} A\right)$$

is the space-time vector potential, $\wedge$ is the outer product of geometric algebra, $\gamma_0$ is the time-like space-time velocity vector defining the inertial frame associated with the 3D space vector potential A and scalar potential $\Phi$, and quantities represented by bold type such as A are always vectors in the 3D space of the inertial frame defined by $\gamma_0$. F is related to the electric field E and magnetic intensity B by $$F = \varepsilon_0 E + III \frac{1}{c \mu_0} B$$

where $III \equiv \gamma_0 \gamma_1 \gamma_2 \gamma_3$ is the pseudoscalar of the geometric algebra. The 3D cross product is related to the wedge product via the pseudoscalar by $III\, a \times b = a \wedge b$. The field G is the sum of F and a polarization field P, $$G = F + P,$$

where the 4D space-time polarization field P is composed of the 3D space vector electric polarization P and magnetic polarization M according to $$P = P - III \frac{1}{c} M$$

so that G may be written as $$G = D + III \frac{1}{c} H,$$

where D is given by the usual expression $$D = \varepsilon_0 E + P,$$

and H is given by the usual expression $$H = \frac{1}{\mu_0} B - M.$$

The polarizations P and M are generally modeled as functions of E and B, often linear functions, but not necessarily. The space-time vector field J representing charge-current density in 4D space-time volumes is related to the charge density $\rho$ and 3D vector current density J by the equation $$J = \gamma_0 \left(\rho - \frac{1}{c} J\right)$$

and the space-time vector field K representing charge-current density on 3D boundaries in 4D space-time is related by the equation $$K = \gamma_0 \left(\sigma - \frac{1}{c} K\right)$$

Nonlinear Embodiments

As mentioned above, the potential A is a function of the parameters $c_i$. The parameterization may be assumed to be linear in the parameters. If a parameterization is chosen that is nonlinear in the parameters, a solution may be found that extremizes the action by any of various other methods, such as Newtonian iteration with linearized approximations to the potentials and fields.

Also, for simplicity it is assumed that the fields G, D, and H are linear functions of the fields F, E, and B, respectively, but these may be nonlinear functions in which case the Lagrangian density may need additional corresponding terms and solutions may be found that extremize the action by any of various other methods, such as perturbation theory.

User Interface—Tolerance, Grid, Simplices, Basis Functions, Material Parameters

User interface 202 may be used for receiving input for setting up the problem to solve and outputting results of computing electromagnetic fields. Tolerance choice 204 is an input for entering the tolerance for performing the computations or another form of input for determining the accuracy with which to perform the computations.

Grid choices 206 includes one or more input fields for defining the space in which the problem is solved, including the grid on which the problem is solved, and/or the initial state of the system. In an embodiment, the grid may be chosen to divide space or space-time into regions that are simplices. Simplices may be especially desirable when the parameterized potential is defined to be a linear function of position within each simplex. In the case where the parameterized potential is defined to be a linear function of position within each simplex, a continuous potential may be parameterized by the values of the continuous potential at all simplex vertices, the field F is a constant within each simplex, because the field F is defined to be a linear combination of derivatives of A, and the field G is also a constant within each simplex if the field G is a linear function of the field F. However, the invention is not limited to situations in which G is a linear function of F, and simplices may be used when G is not a linear function of the field F. Simplices may be defined that cover all of the simulation space, or may be combined with regions of other or arbitrary shape. Including simplices with or between regions of arbitrary shape may make it easier to define potential basis functions that are effectively continuous at all boundary points.

Another example of a situation where it may be convenient to have some regions that are simplices and some that are not is to cover a region containing a nonlinear material with simplices, and to use a single space-time region for a homogenous linearly polarizable medium outside this material.

Basis functions 210 may include a set of default basis functions that the user can choose. Basis functions 210 may also include an input field via which the user can input a basis function of the user's own choice. Basis function choices 210 may include a list of default basis functions, which the user may choose. In an embodiment, the default basis functions when multiplied by a series of quantities (which may be referred to as parameters) and summed together may form parameterized functions, and solving for the parameters solves the electromagnetic equations. In an embodiment, each basis function may satisfy the electromagnetic field equations in the regions that do not include the boundary between homogeneous regions. Basis functions may be defined in terms of fields that would result from fictitious "virtual" charge and current densities, such as point dipole moments, in a corresponding fictitious space filled with an unbounded uniform polarizable medium. In one embodiment, one or more virtual point dipole moments at each of a series of different points are used to define basis functions. The positions, directions, and type (electric and/or magnetic) of the virtual dipole moments may be chosen to form a good set of basis functions, and the magnitudes of these virtual dipole moments may be the parameters $c_j$. In an embodiment, the virtual dipole moments and/or other virtual charge and current densities are located outside of a computation cell and/or region in which the basis function is being defined.

Material parameters 212 may include the material parameters that the user can choose for each region of the space in which the problem is being solved, for example. In an embodiment, material parameters may include combinations of material parameters associated with common materials, so that the user can just specify the name of the material and the combination of parameters associated with that material may be assigned to the region chosen.

Basis function 214 may include an algorithm for choosing basis functions when the user has not chosen and/or may include an algorithm for converting the user's input into a function that is called by the code as the basis functions that are used by least action extremizer 201 to extremize the action integral and solve for the fields.

Characterization of Potentials by Values at Boundary Points

Two ideas that may be useful for choosing a method of defining basis potential functions. First, a potential that satisfies the Euler-Lagrange equations throughout any bounded region of material with continuous polarizability is uniquely specified by the value of the potential on the boundary, because the boundary value of the potential (which is generally different at different points), in combination with the Euler-Lagrange equation (a second order differential equation for the potential), uniquely determines the potential at all points enclosed by the boundary. Second, a space-time potential A that is equivalent to another space time potential A', in the sense of resulting in the same electromagnetic fields, can be obtained by adding the space-time gradient $\nabla \psi$ of any scalar field $\psi$ that satisfies $\nabla^2 \psi = 0$ so that $A' = A + \nabla \psi$; and further, a field $\psi$ that satisfies $\nabla^2 \psi = 0$ can always be chosen to give any desired value of $\eta \cdot \nabla \psi$ on a boundary with normal $\eta$, and therefore only the scalar potential of A and the parts of the vector potential portion of A that are not perpendicular to the boundary need to be specified.

With these ideas (the idea that a potential is determined by the boundary values of the potential and the idea that only the scalar potential of A and the parts of the vector potential portion of A that are not perpendicular to the boundary need to be specified), a basis potential can be specified at all points in any space that is made up of regions each filled with homogeneous polarizable media by specifying the value of the basis potential at the boundary, excluding the perpendicular vector component, at all boundary points, and also requiring that the basis potential satisfies the Euler-Lagrange equation at non-boundary points. With this specification (that the potential satisfy the Euler-Lagrange equation at all non-boundary points and that the basis potential is determined by the values at the boundaries), the only remaining problem is to calculate the basis potential at any point within a region, given the basis potential values on the boundary of that region.

Computing the potential at nonboundary locations based on the boundary values can be expressed symbolically as an integral over the boundary of a Greens function and the basis potential values on the boundary, but numerical computation based on this may not be very efficient.

However, various other methods can be used to efficiently calculate good approximate basis functions at non-boundary points. Two are described in the next two sections, on virtual sources and on approximate solutions to the Euler-Lagrange equation.

Calculation of Potential Values at Points in One Region Using Virtual Sources

In this specification, the phrase "physical source" refers to any charge-current source that exists in the situation being simulated, and the phrase "virtual source" refers to any charge-current source that does not exist in the situation being simulated, but rather is a mathematical artifice used to help calculate potentials and fields, in analogy with virtual images in optics.

The calculation of potential values at points inside one region using virtual sources takes advantage of the fact that the potential at any point in an infinite homogeneous polarizable space specified by a charge-current source is much easier and faster to calculate than the potential at any point in a bounded polarizable region specified by the potential on the boundary of the region. Further, if the potential in such an infinite space has the desired values of the potential at the boundary points and the charge-current source is zero inside the boundary, then this potential will equal the correct, desired basis potential (for i≠0) for points inside the specified boundary in the original problem.

If we have a suitable parameterized virtual source or set of virtual sources, such as a set of suitably located dipoles with parameterized amplitudes, we can choose the parameters to create an acceptable approximation to the desired boundary potential values, and therefore an acceptable approximation to the desired potential throughout the bounded region (note that these parameters are determined when the basis functions are set up as just described and are subsequently treated as constants; they are not the parameters $c_i$ that are determined by extremizing the action). By choosing a large enough set of parameters and corresponding sources, we can make this approximation as good as desired.

Recall that each basis function may be first specified by giving its values at all boundary points, and that the i=0 basis function satisfies the Euler-Lagrange equation (the inhomogeneous Maxwell equations) with the source equal to the physical source given in the problem while the i!=0 basis functions satisfy this equation with the source set to zero. Then, for each basis function, this process of choosing virtual sources is repeated for each region with homogeneous polarizability with a different set of virtual sources, chosen so that the potential equals the specified values on the boundary for the given basis potential. The result is a set of basis potentials, each one defined at every point, satisfying the Euler-Lagrange equation at every non-boundary points, and effectively continuous at all boundary points within some specified tolerance. The resulting basis potentials generally do not satisfy the boundary Euler-Lagrange equation at all boundary points, but its integral in the action will be optimally minimized by the final solution found for the parameterized potential by choosing the parameters $c_i$ to extremize the action.

Although many choices of virtual sources can be used and will generally result in some final solution, some choices will give much better results than others. One useful general approach to choose virtual point dipole sources, and to choose their locations by considering that electric dipoles predominately "paint" a nearby boundary with a scalar potential if the electric dipole axis is oriented perpendicular to the boundary, and magnetic dipoles predominately "paint" a nearby boundary with a tangential vector potential if the magnetic dipole axis is oriented tangentially to the boundary. Then, by using a set of virtual point electric dipoles that lie outside the boundary in the auxiliary space, with axes pointed toward the part of the boundary that is close, and with a spacing between the dipoles that is comparable to the distance between the dipoles and the boundary, any scalar potential function on the boundary can be approximated well by adjusting just the amplitudes of these virtual point dipoles. The same process may be applied to compute the vector potential by using a tangential point magnetic dipole (described by two, instead of one, amplitude parameters for the two independent tangential directions) in place of the perpendicular electric dipole.

Calculation of Potential Values at Points in One Region as Approximate Solutions to the Euler-Lagrange Equation Continuous basis functions that exactly or approximately satisfy the Euler-Lagrange equations may be defined in various ways. For example, if a region is very thin compared with the radius of curvature of the region, such as a matching region as discussed in another section, or if the wavelength in the region is small compared with the radius of curvature of the boundary of the region, such as a piece of formed sheet metal, and if the potential outside the region (the region that is very thin or has a wavelength that is small compare to the radius of curvature) and therefore on the region's boundary is defined such as by using virtual sources, it may be possible to quickly identify simple acceptable approximate expressions for the potentials and fields that satisfy the Euler-Lagrange equation inside the region.

For example, for the potential may be chosen as the product of the potential value on the boundary times a function of the perpendicular distance from the boundary such as a power series, an exponential function, or the product of a power series and exponential function.

In other words, the value of the potential A on the boundary is used, as given by whatever method is used to define the potential in the region on the other side of the boundary of the region of interest, and from value of the potential on the boundary (as defined by the potential on the other side of the region of interest) the "medium potential" $A_m$ in the region of interest at boundary points is calculated (as described in another section), and the second order differential equation that the medium potential obeys inside the region of interest is used to identify an approximate, or exact if practical, expression for $A_m$ inside the region of interest. Then the calculated expression for $A_m$ at any point is used to calculate A at any point, from which F and G at boundary points of the region of interest can calculated, numerically and possibly symbolically. The volume integrals over the region of interest for which F and G were calculated may then generally be acceptably approximated as equal to zero, and the boundary integrals can be easy and fast to compute.

Computing $A_m$ from the boundary values while requiring that $A_m$ satisfy the Euler-Lagrange equations can be a useful method because the differential equation for $A_m$ (assuming for simplicity that there is no specified charge or current $J_m$ inside this region of interest) is simple, $$\nabla_m^2 A_m = 0$$

or equivalently, for any particular orthonormal coordinate system {x,y,z}, $$\left(\frac{1}{v_m^2}\partial_t^2 - \partial_x^2 - \partial_y^2 - \partial_z^2\right)A_m = 0.$$

For simplicity, it may be assumed that z is perpendicular to the boundary in the region of interest. It might be assumed that no quantities, including $A_m$, change quickly tangentially to the boundary, so that the x and y derivatives may be neglected. Then the above equation may be approximated as, $$\left(\frac{1}{v_m^2}\partial_t^2 - \partial_z^2\right)A_m \approx 0$$

If there are quantities that vary harmonically with time and if the harmonically varying quantities of time are represented with complex fields, the above equation may be replaced by $$\left(-\frac{\omega^2}{v_m^2} - \partial_z^2\right)A_m \approx 0$$

or $$(k_m^2 + \partial_z^2)A_m \approx 0$$

where $k_m = |\omega|/v_m$ is the medium wavenumber. If $k_m$ is negligibly small compared with the thickness of the region, then the above equation says that the second derivative of $A_m$ is (approximately) equal to zero, so $A_m$ is just a linear function of position along any line through the thin material perpendicular to the boundary of the region of interest, changing between the two values of $A_m$ that are given by the potential values outside the region of interest. If the wavenumber is large compared with the thickness of the region and is predominantly imaginary—as for an electrical conductor—then the solution for $A_m$ is just an exponential function that begins at the value on the boundary that is specified by the potential outside the region, and exponential drops to zero inside this region. For other values of the medium wavenumber, the solution may be written as an exponential function with a generally complex argument. Other approximations and solutions may also be used. For example, the region may contain a boundary of discontinuity in polarizability, in which case the potential approximation may be continuous but piecewise linear across the discontinuity.

In this way acceptable approximate expressions for $A_m$ everywhere can be found. The potential A may be computed on the boundary of a region and nearby the boundary, and then the fields F and then G may be computed on the boundary in this region. Assuming the potential A and field G have already been determined on the other side of the boundary, the change $\Delta G$ in the field G across the boundary can be calculated and with the calculation of $\Delta G$ the required boundary integrals may also be calculated.

Throughout this discussion of computing the fields F and G, a general potential A and corresponding fields F and G have been referred to, but the entire discussion also applies to basis potentials $a_i$ and corresponding fields $f_j$ and $g_j$ (after computing basis potentials $a_i$ and corresponding fields $f_j$ and $g_j$ the general potential A and corresponding fields F and G may be solved for by solving for the coefficients $c_i$ form the matrix equations resulting from the action integral).

Potential Matching Regions

A basis potential defined in every homogenous regions using virtual sources has the advantage of being fast to compute and exactly satisfying the Euler-Lagrange equations at all non-boundary points and thereby resulting in volume integrals equal to zero, but the disadvantage of typically having a poor continuity of the potential across the boundaries and an associated difficulty when analyzing errors.

In comparison, a basis potential defined in a homogeneous region as an approximate solution to the Euler-Lagrange equation has the disadvantage of generally resulting in a small but non-zero volume integral, but the advantage of being definable to have perfect continuity at all boundary points.

To take advantage of the strengths of each of these two methods (that is to take advantage of both the method of using basis functions that satisfy the Euler-Lagrang equations exactly in the homogeneous regions and the method of using basis functions that have perfect continuity at all boundaries) both methods may be used for any basis function. For example, for every boundary identified by a discontinuity in polarizability, a new region may be defined that is thin, but not too thin, in the direction perpendicular to the boundary and that contains the original boundary.

Then approximate solutions may be used for every such thin region and virtual sources for every other region. Using a combination of approximate solutions for thin regions and virtual sources for every other region can result in perfect continuity of the potential at every point, and volume integrals that are either exactly zero, small enough to approximate as zero, or small with an integral that is easily approximated and can be quickly calculated.

Initial state generator 218 generates the initial state, based on the user's input. Output generator 220 generates and formats the output of action extremizer 201 and presents the output in accordance with the user's choices.

Method

Figure 3:
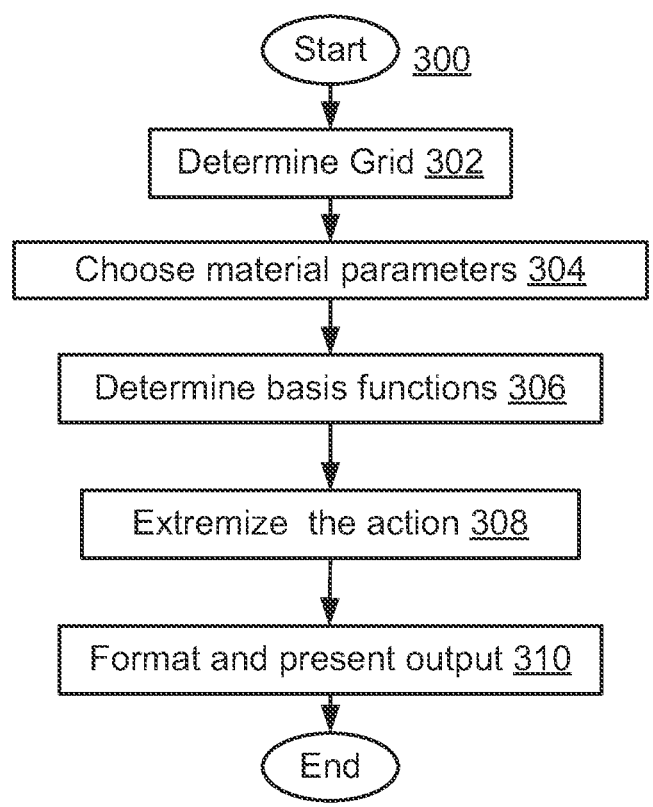
FIG. 3 is a flowchart of an embodiment of a method that is implemented by processor system.

FIG. 3 is a flowchart of an embodiment of a method 300 that is implemented by processor system 300. In step 302, a determination is made of how to set up the grid, such as the size of the different regions of the problem area. In step 304 material parameters are chosen for each region. In step 306, a determination is made as to what basis functions to use for solving the electromagnetic fields. In an embodiment, the basis functions are parameterized solution to the electromagnetic equations in a homogeneous region. In step 308, the action is extremized (e.g., minimized), which may involve adjusting the parameters of the parameterized basis functions to extremize the action integral at the boundary between homogenous regions. In step 310, the output of action extremizer 201 is formatted and presented to the user.

In an embodiment, each of the steps of method 300 is a distinct step. In another embodiment, although depicted as distinct steps in FIG. 3, step 302-310 may not be distinct steps. In other embodiments, method 300 may not have all of the above steps and/or may have other steps in addition to or instead of those listed above. The steps of method 300 may be performed in another order. Subsets of the steps listed above as part of method 300 may be used to form their own method.

Figure 4:
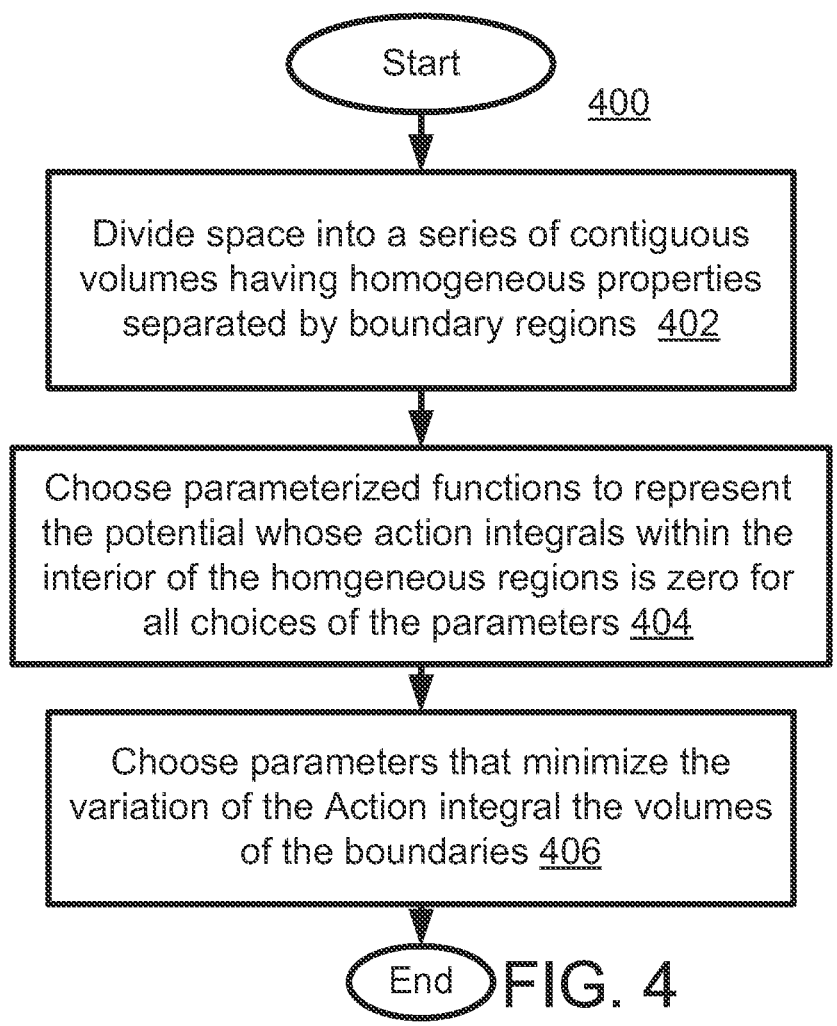
FIG. 4 is a flowchart of an embodiment of a method for solving the electromagnetic equations.

FIG. 4 is a flowchart of an embodiment of a method 400 for solving the electromagnetic equations. Method 400 may be an embodiment, of step 308 of method 300. In step 402, the region in which the problem is being solved is divided into a series of homogenous regions, each homogeneous region being a region in which the material is homogeneous throughout the region. In step 404, choose parameterized basis functions that are solutions of the electromagnetic equations in the homogeneous regions that do not include the boundaries between regions. In step 406, the parameters are adjusted to zero the value of the action.

In an embodiment, each of the steps of method 400 is a distinct step. In another embodiment, although depicted as distinct steps in FIG. 4, step 402-406 may not be distinct steps. In other embodiments, method 400 may not have all of the above steps and/or may have other steps in addition to or instead of those listed above. The steps of method 400 may be performed in another order. Subsets of the steps listed above as part of method 400 may be used to form their own method.

Regions and Boundaries

Figure 5:
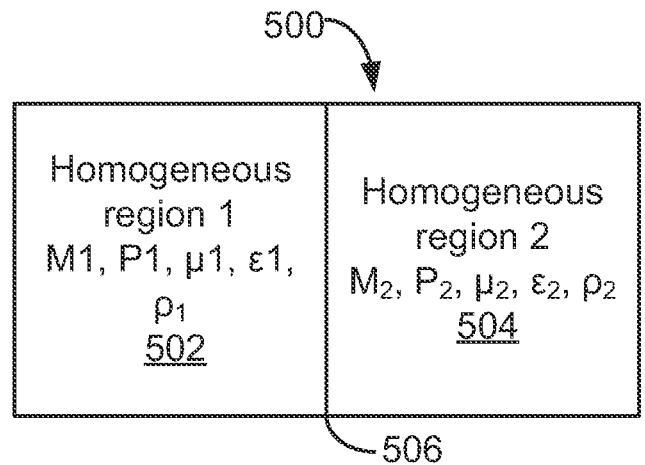
FIG. 5 shows an example of homogeneous regions for computing the electromagnetic fields.

FIG. 5 shows an example 500 of homogeneous regions. Example 500 includes region 502, region 504, and boundary 506. In other embodiments, example 500 may include additional components and/or may not include all of the components listed above. Region points may generally be considered to exclude boundary points, but the phrase "interior region point" or "non-boundary point" may be used to make it explicitly clear that the point is in the region is not a boundary point if it is important in a discussion that the point is not a boundary point.

Region 502 is homogeneous region 1, which has a homogeneous set of material parameters. In other words, throughout region 502 each of the material parameters is assigned a uniform value. The material parameters may include the permittivity (or susceptibility), permeability, polarization, magnetization, resistivity (or conductivity), for example. Charge and current density may also be specified and described with the help of parameters. A specified electric polarization or magnetization would normally be represented by the corresponding specified bound charge or boundary current densities. Region 504 is homogeneous region 2, which also has a homogeneous set of material parameters, which may be different than those of region 502. Boundary 506 separates region 502 and region 504, and is where the computations are primarily formed. Region 502 and region 502 may represent two physical regions that have distinctly different sets of material parameters with the same values as assigned during the computations. A region having a continuously varying set of material parameters may be approximated in various ways, such as by dividing the region into smaller regions of homogeneous material parameters.

Figure 6:
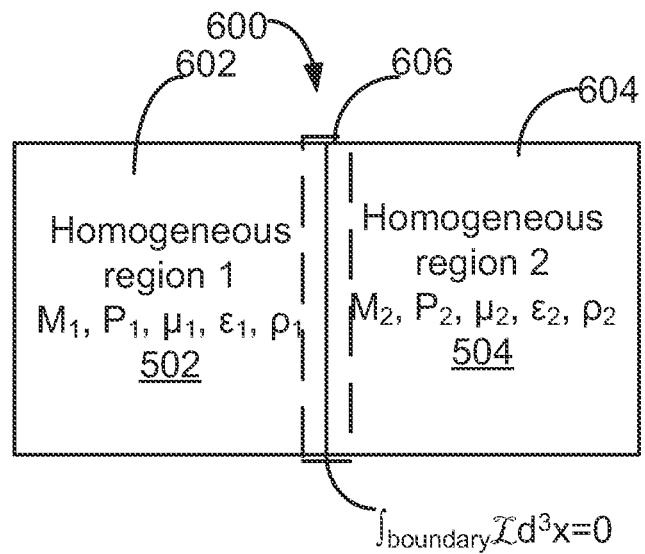
FIG. 6 shows an example of computational regions corresponding to the homogeneous regions of example with a thin boundary region.

FIG. 6 shows an example 600 of computational regions corresponding to the homogeneous regions of example 500. Example 600 includes region 602, region 604, and boundary 606. In other embodiments, system 600 may include additional components and/or may not include all of the components listed above.

Region 602 is an interior region of homogeneous region 1, and region 604 is an interior region of homogeneous region 2. In region 602 and region 604 no actual computations may need to be carried out. For each region 602 and 604, a different set of parameterized basis functions that satisfy the electromagnetic equations in the interior region are chosen as the solutions. Each basis function extends over all of space and is continuous at all points of space, which in the example of FIG. 6 includes regions 602 and 604. Each basis function, though, typically has a "kink" across a boundary, corresponding to discontinuity in the derivative of the basis function. The values of any given basis function in region 602 and the value in region 604 may both be defined with the help of virtual sources, although different virtual sources will be used for each region and the material parameters, such as polarizability, of each region may differ. The computational parameters, or simply the parameters (e.g., the coefficient $c_j$ multiplying each basis function in the expressions for any of the potential or electromagnetic fields, such as $A=\Sigma_j a_j c_j$), are independent of region or position in space or time.

Boundary 606 includes points representing a boundary between two regions. Boundaries are modeled as mathematical surfaces, which are usually smooth. A real physical boundary may be very close to a mathematical surface, such as the boundary between a glass and air, or may have some small but negligible thickness such as the boundary between a piece of wood and adjacent concrete. The computations of the electromagnetic fields by extremizing the action integrals, are primarily performed using integrals over the points of boundary 606, allowing the computational parameters $c_i$ to be chosen to extremize the action.

EXAMPLE

Figure 7:
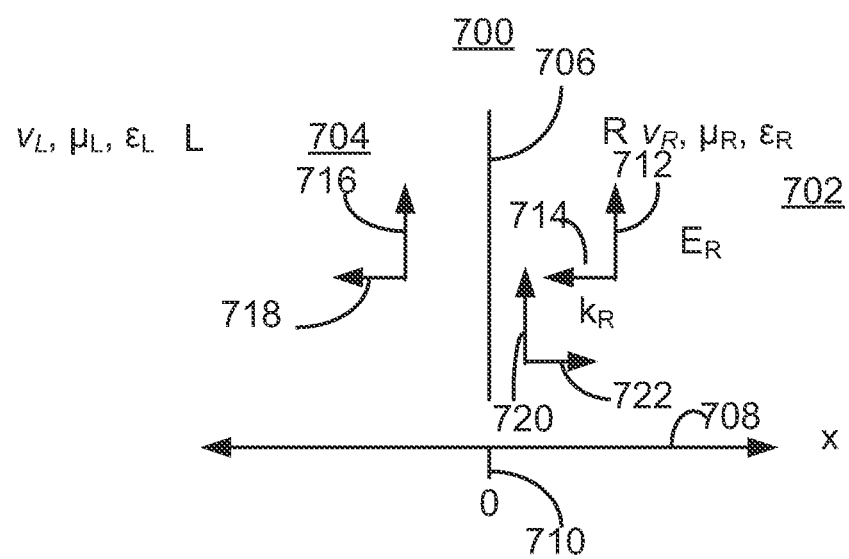
FIG. 7 shows is a diagram illustrating elements of an example to which the least action method is applied.

FIG. 7 shows is a diagram illustrating elements of an example 700 to which the least action method is applied. Example 700 may include medium 702, medium 704, interface 706, x-axis 708, origin 710, incident wave 712, travel direction 714, transmitted wave 716, travel direction 718, reflected wave 720, travel direction 722.

Consider example 700 in which a plane wave is incident on a flat boundary between two regions with homogenous electric and magnetic polarizabilities, with the direction of wave propagation perpendicular to the surface. In FIG. 7, medium 702 is the medium on the right side of the diagram and the functions and quantities associated within medium 702 have the subscript R. Medium 702 has a permittivity $\in_R$ and a permeability of $\mu_R$. The phase velocity of waves in medium 702 regions are $v_R=1/\sqrt{\mu_R \in_R}$, and the wave number in medium 702 is $k_R=\omega/v_R$, where $\omega$ is the angular frequency of the wave. In other problems other factors may be considered.

Similarly, medium 704 is the medium on the right side of the diagram and the functions and quantities associated within medium 704 have the subscript L. Medium 704 has a permittivity $\in_L$ and a permeability of $\mu_L$. The phase velocity of waves in medium 704 regions are $v_L=1/\sqrt{\mu_L \in_L}$, and the wave number in medium 702 is $k_L=\omega/v_L$. It may be assumed that mediums 702 or 704 are idealized in the sense that neither is conductive and both transmit electromagnetic waves without loss, or a complex permittivity may be used in the usual way to represent electrically conductive media with resistivity.

Interface 706 is the interface between the two media. In the coordinate system of FIG. 7, x-axis 708 indicates the position of the waves traveling within mediums 702 and 704. Origin 710 is the point on x-axis 708 that the value of the position coordinate is 0. Although the physics should not depend on the coordinate system, this choice of coordinates simplifies the computations, so that issues that do not relate to the demonstrating the method do not need to be discussed.

Incident wave 712 is a plane wave of light entering from the right hand side of FIG. 7. Incident wave 712, the parameters of incident wave 712, and the material parameters of media 702 and 704 are the inputs to the problem. Travel direction 714 is the direction in which incident wave 714 travels, which is the same direction in which wave-vector $k_{OR}$, defined below, points.

Similarly, reflected wave 716 is a wave of light that was reflected from interface 706 as a result of incident wave 712 hitting interface 706. Travel direction 718 is the direction in which reflected wave 716 travels, which is the opposite direction as incident wave 712. Whereas, transmitted wave 720 is a wave of light that was transmitted through interface 706 as a result of incident wave 712 hitting interface 706. Travel direction 722 is the direction in which transmitted wave 720 travels, which is the same direction as incident wave 712 (the wave vector of transmitted wave, $k_{OL}$, is therefore parallel to $k_{OR}$ but has a different magnitude).

Using the method of least action to solve for the resulting fields in example 700, we first choose a set of basis potential functions. These are required to be continuous at all points. It is generally preferable to choose basis functions such that the parameterized potential satisfies the Euler-Lagrange equations at all non-boundary points for any set of values of the parameters $c_j$, so that the volume integrals are zero. By choosing basis functions such that the parameterized potential satisfies at all non-boundary points, which are constructed from one incident wave traveling toward the boundary that is created by some distant charge-current source (such as an antenna, or oscillating dipole), and from other waves that are traveling only away from the boundary (since we are assuming in the example problem of FIG. 7 that there are no other sources) with the appropriate wave number within each region. The source that produces the incident potential wave is not currently of interest and need not be specified, but could be. For simplicity a gauge is chosen in which the scalar potential $\Phi$ is identically zero. Further, to simplify the computations, basis functions are also chosen that meet known or expected exact or approximate properties of the solution due to symmetry or other characteristics of the problem. In the example of FIG. 7, the source or applied wave that is due to the distant source can be acceptably approximated as a plane wave with perpendicular incidence at the boundary, and all other waves are also acceptably approximated as plane waves with the wave vector and vector potential parallel to those of the incident wave (i.e., parallel to $\hat{x}$ and $\hat{z}$, respectively). A more general set of basis functions could be used, such as by including wave vectors that are not perpendicular to the boundary, and in more complex cases a more general set of wave vectors is usually preferable (allowing the solving of the problem to be automated without needing to find the specialized set of basis function best suited for each problem), but in the simple example of FIG. 7 with high symmetry, more complex basis functions would just result in more algebra with the same final result.

With these choices (the choice the waves originating from a distant source that is outside of the region and the choice of the using plane waves wave vector potentials that are not perpendicular to the boundary traveling in a direction that is either towards or away from the boundary), only one function of position $r=x\hat{x}+y\hat{y}+z\hat{z}$ is a candidate for constructing basis functions on the Left side of the boundary, which is a wave $a_{LL}$ traveling to the Left (decreasing values of the x coordinate), $$a_{LL}=\hat{z}\exp[i(k_{LL}\cdot r-\omega t)]$$

with wave-vector $k_{LL}$ such that $k_{LL}\cdot\hat{x}=-k_{LL}$ is a negative number with $k_{LL}\equiv|k_{LL}\cdot\hat{x}|$. Only two functions are candidates for constructing basis functions on the Right, which are a wave $a_{RL}$ traveling to the Left and a wave $a_{RR}$ traveling to the Right, which may be written as, $$a_{RL}=\hat{z}\exp[i(k_{RL}\cdot r-\omega t)]$$

$$a_{RR}=\hat{z}\exp[i(k_{RR}\cdot r-\omega t)]$$

with wave-vector $k_{RL}$ such that $k_{RL}\cdot\hat{x}=-k_{RL}$ is a negative number with $k_{RL}\equiv|k_{RL}\cdot\hat{x}|$, and wave-vector $k_{RR}$ such that $k_{RR}\cdot\hat{x}=+k_{RR}$ is a positive number with $k_{RR}\equiv|k_{RR}\cdot\hat{x}|$ and $k_{RR}=k_{RL}$. From the waves $a_{LL}$, $a_{RL}$, and $a_{RR}$, only two independent basis potential functions that are continuous at the boundary. A simple choice for such functions is one, $a_0$, defined by $$a_0=a_{RL} \text{ for } x>0 \text{ and}$$

$$a_0=a_{LL} \text{ for } x<0,$$

describing a wave traveling to the left on both the right and the left sides of the boundary, and one, $a_1$, defined by $$a_1=a_{RR} \text{ for } x>0 \text{ and}$$

$$a_1=a_{LL} \text{ for } x<0,$$

describing a wave that is traveling to the right on the right side and to the left on the left side.

The final parameterized vector potential is $$A=c_0 a_0+c_1 a_1$$

Note that this potential ($A=c_0 a_0+c_1 a_1$) meets the requirement of being a potential that is continuous at all points for any values of parameters $c_i$, and satisfies the preference for a potential that satisfies the Euler-Lagrange equations at all non-boundary points for any values of parameters $c_i$.

The first of these basis functions, $a_0$, represents the incident wave on the right, the parameter $c_0$ (which is the coefficient of $a_0$) is determined by the strength of the distant source. For simplicity, and without loss of generality, the value of $c_0$ may be set equal to 1 (or $c_0=1$). The second basis function, $a_1$, represents a wave that, in some sense, is due to bound polarization charge and current at the boundary between the two media with different polarizabilities, and will be given the index i=1. The coefficient of $a_1$ is the parameter $c_1$, which is may be determined by extremizing action.

As an aside, note that with the choice of $a_0$ and $a_1$ as basis functions, the amplitude $C_T$ of the transmitted wave (the leftward-traveling wave on the left side, $a_{LL}$) is $C_T=C_0+c_1$, and the amplitude $C_R$ of the reflected wave (the rightward-traveling wave on the right side, $a_{RR}$) is $C_R=C_1$.

Now, proceeding to find $c_1$ by extremizing the action S. As stated earlier, extremizing the action is equivalent to solving the system of equations $$\Sigma_{j=0}\int(\phi_i^*(\hat{n}\cdot\Delta d_j)-a_i^*\cdot(\hat{n}\times\Delta h_j))dn \, c_j=-\int(\phi_i^*(\hat{n}\cdot\Delta d_0-\sigma)-a_i^*\cdot(\hat{n}\times\Delta h_0-K))dn$$

For this simple problem, both indices i and j take only the value 1, the scalar potential basis functions $\phi_i$ are zero, x=0 at the boundary where this integral is being evaluated, the integrand is independent of position on the boundary so the integral is proportional to the integrand. Consequently, this last equation becomes $$-a_1^*\cdot\hat{n}\times\Delta h_1 c_1=+a_1^*\cdot\hat{n}\times\Delta h_0 c_0$$

The magnetic intensity h is defined as a function of the magnetic field b, given by $$h_j=\frac{1}{\mu}b_j$$

where $\mu$ is the permeability on the left, $\mu=\mu_L$, for points r on the left, or the permeability on the right, $\mu=\mu_R$, for points r on the right, and the magnetic field $b_j$ is defined as a derivative (the curl) of the potential $a_j$, given by $$b_j=\nabla\times a_j.$$

Since $a_j=\hat{z}\exp[i(k_j\cdot r-\omega t)]$, where k may depend on both j and which side of x=0 $k_j$ is evaluated, $b_j$ is given by $$b_j=(\hat{x}\partial_x)\times a_j=\hat{x}\times\partial_x a_j=-i\hat{y}k_j\cdot\hat{x}.$$

Now, the triple vector product, $$a_1^*\cdot\hat{n}\times b_j=-i\hat{z}\cdot(\hat{x}\times\hat{y})k_j\cdot\hat{x}=-ik_j\cdot\hat{x},$$

can be evaluated. Then the vector products in the equation to be solved for $c_1$ are $$a_1^*\cdot\hat{n}\times\Delta h_1=-i(k_{1R}/\mu_R-k_{1L}/\mu_L)\cdot\hat{x}$$

and $$a_1^*\cdot\hat{n}\times\Delta h_0=-i(k_{0R}/\mu_R-k_{0L}/\mu_L)\cdot\hat{x}$$

where $k_{jx}$ means the value of the wavevector for basis potential j (j=0 or 1) on side X (X=R for right or L for left) of the boundary. The equation to be solved becomes $$\left(\frac{k_{1R}}{\mu_R}-\frac{k_{1L}}{\mu_L}\right)\cdot\hat{x}c_1=-\left(\frac{k_{0R}}{\mu_R}-\frac{k_{0L}}{\mu_L}\right)\cdot\hat{x}c_0$$

Correctly accounting for signs of the wave-vectors dotted into the unit vector $\hat{x}$, this is $$\left(\frac{k_R}{\mu_R}+\frac{k_L}{\mu_L}\right)c_1=\left(\frac{k_R}{\mu_R}-\frac{k_L}{\mu_L}\right)c_0$$

where $k_R\equiv k_{RR}=k_{RL}$ and $k_L\equiv k_{LL}$. It is convenient to define $$\beta=\frac{k_L/\mu_L}{k_R/\mu_R},$$

and write the solution as $$c_1 = \frac{1-\beta}{1+\beta} c_0$$

The amplitude of the rightward-going wave on the right (the reflected wave) is equal to $c_1$, and the amplitude of the leftward-going wave on the left (the transmitted wave) is equal to $$c_0 + c_1 = \frac{2}{1+\beta} c_0$$

These are the well-known results for the solution and for the reflection and transmission amplitudes.

If it is assumed that $\mu_R = \mu_L$, (as assumed by Pankofsky and Philips, second edition, pages 195-200, for example) the above relationships reduce to the appropriate Fresnel equations.

In contrast, the usual textbook method of analyzing this problem is to begin with the electric and magnetic fields rather than the potential, and the boundary conditions $\hat{n} \cdot \Delta D = \sigma$      (first boundary condition), $\hat{n} \times \Delta H = K$      (second boundary condition), $\hat{n} \times \Delta E = 0$      (third boundary condition), and $\hat{n} \cdot \Delta B = 0$      (fourth boundary condition), which are derived from, and correspond to, Maxwell equations. Whichever of these equations results in the solution that is sought would be applied, which, in the particular case of plane waves at normal incidence, turns out to be the second and third boundary conditions, above. The third and fourth of these boundary conditions are equivalent to the method of least action requirement that the potential is continuous across the boundary. The first and second, however, may be derived from but are not equivalent to the more general requirement of the method of least action. This more general requirement of the method of least action as applied to boundary problems like that of FIG. 7 combines the first and second boundary conditions by multiplying the first by the basis function $\phi_1$ of the scalar potential and subtracting the dot product of the second with the basis function $a_i$ of the vector potential, and then integrating over the boundary. The use in numerical electromagnetic calculations of such an integrated product of the first and second boundary conditions by the scalar and vector potentials is unique, and results in the best solution to a large class of problems involving any electrically or magnetically polarizable or electrically conductive materials, any frequency, any number of objects, and any boundary shapes. Although experience and intuition may allow simpler calculations in some cases, for general cases, the method of least action provides a single generally applicable recipe that not only works in all cases, but is optimal. In contrast, other methods, such as the "method of moments" use ad-hoc selections of some of these boundary conditions and an ad-hoc weighting of the boundary conditions, dictated by prior examples. Since the method of least action provides a single recipe for computing a wide variety of electromagnetic fields, the method of least action is better suited for use in a computer program that computes electromagnetic fields.

An Example of the Use of Virtual Sources

Figure 8:
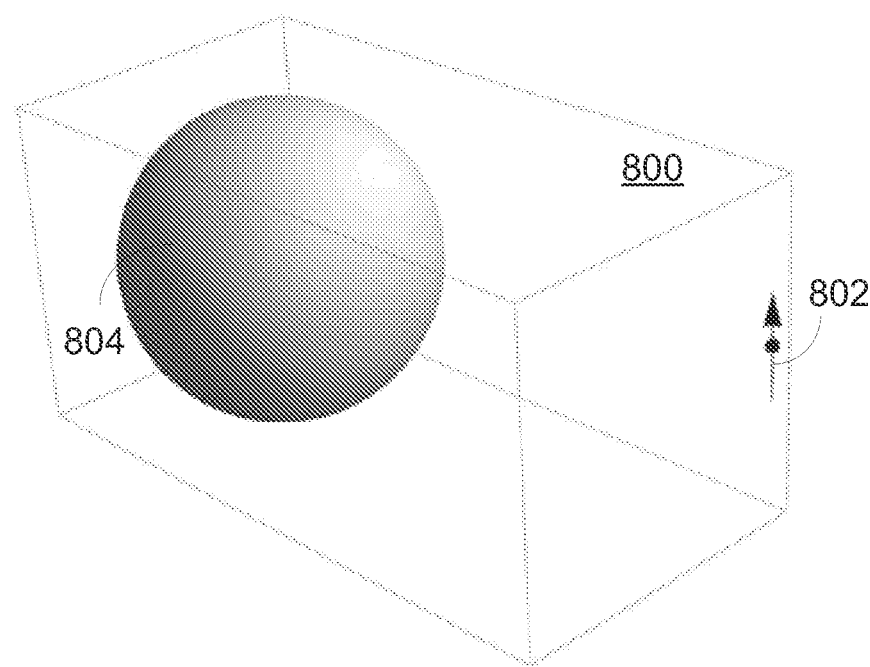
FIG. 8 shows another sample problem having a dielectric sphere and a point dipole.

FIG. 8 shows a sample problem 800. Sample problem 800 includes dipole 802, polarizable sphere 804. Dipole 802 has a moment pointing in the direction of the arrow representing the dipole. Polarizable sphere 804 is made from a homogeneous polarizable material. The objective of problem 800 is to solve for the electric and magnetic fields induced by dipole 802 inside and outside of the sphere. The problem will not be solved here, but instead an application of virtual sources that may be used to solve the problem will be discussed.

Space may be divided into two regions for purposes computing the electromagnetic field in the example of FIG. 8. One region may be the interior of the sphere 804, and the other region may be everything outside of sphere 804. Other methods of defining basis functions may additionally divide either or both of these two regions (the region including the inside of sphere 804 and the region including everywhere else) with homogeneous polarizability into two or more regions, as discussed later.

Recall that one method for defining a set of basis functions is to first i) for each basis function, specify potential field values at all boundary points between homogeneous regions, then ii) specify expressions or a method for quickly calculating potential and field values at any non-boundary point, for a potential that satisfies the Euler-Lagrange equation at all non-boundary points.

Both of these methods (specifying the potential field values at all boundary points between homogeneous regions, and specifying expressions or a method for quickly calculating potential and field values at any non-boundary point, for a potential that satisfies the Euler-Lagrange equation at all non-boundary points) are performed in the example of FIG. 8, with the help of virtual point dipole sources. First, for the basis function with i=0, the potential field on the boundary is specified to be that calculated for the one physical dipole if the sphere were not there, and for each basis function with i≠0, the potential field values on the boundary is specified as those values due to a single virtual point dipole that is inside the sphere. With this choice (the potential field on the boundary being calculated from the one physical dipole in the absence of the sphere, and for each basis function with i≠0, the potential field values on the boundary being the values due to a single virtual point dipole that is inside the sphere), basis potential definitions are immediately obtained in the region outside the sphere that are exactly continuous with the specified boundary values, and that exactly satisfy the Euler-Lagrange equation in the region outside the sphere. Specifically, the fields are calculated from the same physical and virtual dipoles used to calculate the boundary values.

Next, for each of the basis potentials, which are derived from the physical and virtual dipoles, the potential inside the sphere may be defined as a linear combination of fields due to virtual point dipoles located outside the sphere. For convenience the same set of virtual point dipoles are chosen for each basis function, but for each basis function a set of dipole amplitudes may be chosen that gives the best fit (i.e., smallest discontinuity, within a tolerance) to the values of the basis function on the boundary.

We now have a set of basis functions, $a_j$, each one defined over all of space, that can be used to define a parameterized potential $A = \Sigma_j a_j c_j$, and the parameters $c_j$ are chosen to extremize the action. This parameterized potential A results in an associated set of volume integrals that exactly equal zero at all non-boundary points for any set of parameter values $c_j$. Although the resulting potential is only approximately effectively continuous at the boundary of the sphere, more virtual sources can always be chosen so that the discontinuity is smaller than any required value.

The following paragraphs provide greater emphasis on technical details.

Figure 9:
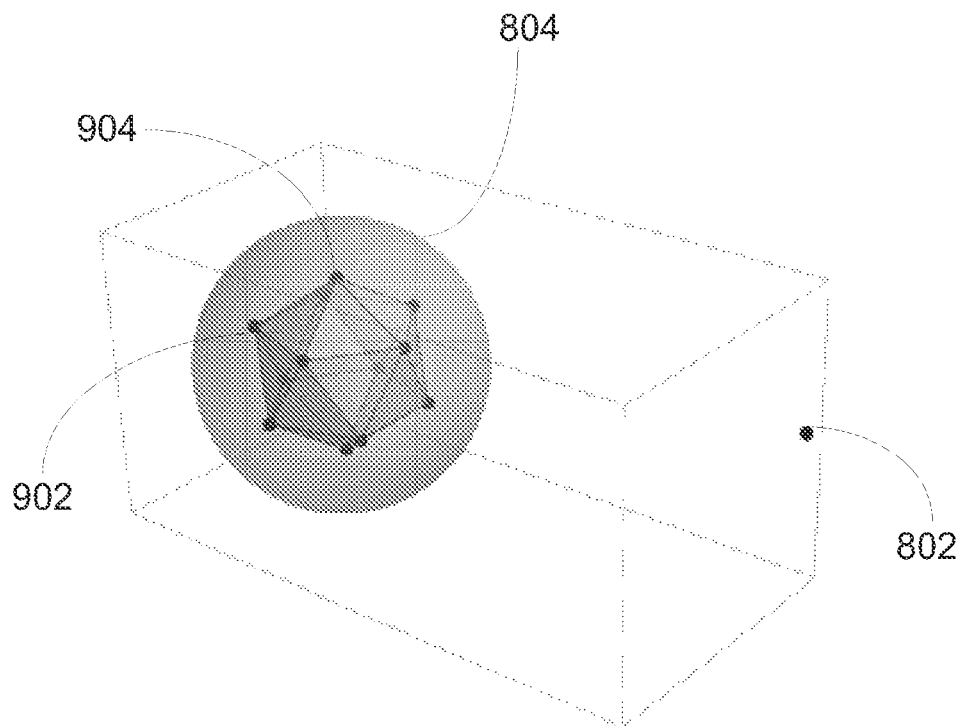
FIG. 9 shows an example of a placement of virtual sources inside the sphere of FIG. 8 for computing the basis potential functions outside of the sphere.

FIG. 9 shows an example 900 of a placement of virtual sources inside the sphere. Example 900 shows sphere 804 with a polyhedron 902 inside having virtual dipoles 904 at the vertices of the polyhedron that is inside the spherical boundary. Polyhedron 902 is used to aid in locating the dipoles 904, which are placed close to the inner surface of the sphere 802. Dipoles 904 are used to generate the basis potentials $a_i$ outside the sphere. The potential in the outer region from each dipole 904 in the inner region is used as a different basis function $a_i$ having a unit dipole moment. For each such basis potential $a_i$ defined outside the sphere with the help of just one virtual dipole, the basis potential $a_i$ is defined inside the sphere as a linear combination of potentials due to virtual dipoles located outside the sphere (which are discussed further in conjunction with FIG. 10, below), with the coefficients chosen to minimize the effective discontinuity of this basis potential $a_i$ across the surface of the sphere. A possible measure of effective discontinuity is described in another section. The end result is a set of basis functions, with each basis function defined outside the sphere by one virtual dipole (or one real dipole in the case of i=0), and defined inside the sphere by a linear combination of virtual dipoles (a different combination for each value of the index i). The coefficients of the linear combination used to define the basis function for each basis index i are determined early in the solution by minimizing the discontinuity at boundary points, and are in addition to the parameters $c_i$ that are later chosen to extremize the action.

Figure 10:
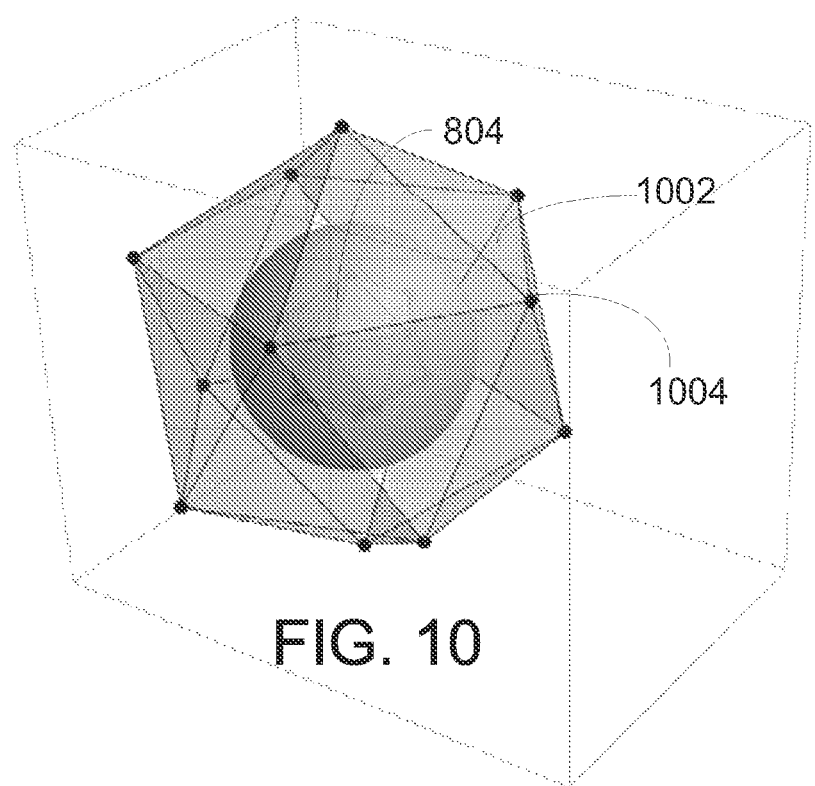
FIG. 10 shows an example of a placement of virtual sources outside the sphere of FIG. 8 for computing basis function within the sphere.

FIG. 10 shows an example 1000 of a placement of virtual sources outside the sphere. Example 1000 shows sphere 802 with a polyhedron 1002 outside having virtual dipoles 1004 at the vertices of the polyhedron. Polyhedron 1002 is used to aid in locating the dipoles 1004, which are placed close to the outer surface of the sphere 802. Dipoles 1004 are used to generate the basis potentials $a_i$ inside the sphere. For each basis function $a_i$, already defined in the outer region and on the spherical boundary as the potential resulting from one dipole source, the potential $a_i$ is defined inside the sphere by a linear combination of the potential resulting from dipoles 1004 outside the sphere, with the amplitudes of the dipoles chosen to minimize the discontinuity in this basis potential at the boundary. Each resulting basis potential $a_i$ is defined at all points in space, and is used to define the parameterized potential $A=\Sigma_j a_j c_j$.

Figure 11:
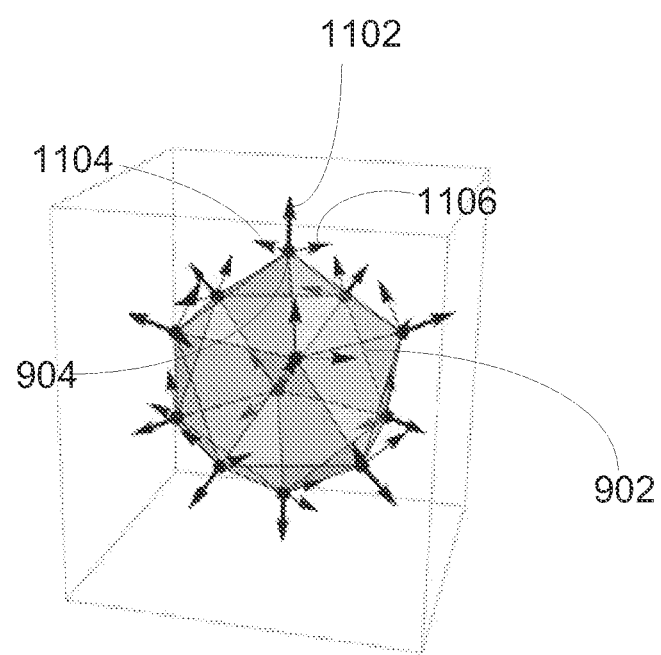
FIG. 11 shows an example of an arrangement of virtual point dipoles on the polyhedron of FIG. 9.

FIG. 11 shows an example 1100 of an arrangement of dipoles on the polyhedron. Example 1100 shows polyhedron 902 with virtual dipoles 904 at the vertices of the polyhedron and electric dipole 1102, magnetic dipole 1104, and magnetic dipole 1106. Electric dipole 1102 is points towards the surface of the sphere and is perpendicular to the surface of the sphere. Magnetic dipoles 1104 and 1106 are perpendicular to the electric dipole 1102 and are therefore parallel to the surface of the sphere at the point on the sphere to which the electric dipole points.

It can shown that only the scalar potential and the tangential part of the vector potential need to be defined and be continuous at boundary points, in order to specify a potential throughout all of space that uniquely determines the fields. All possible potentials can be specified, to some level of approximation, by dividing the boundary into boundary sections, and specifying the average scalar potential and tangential vector potential on each boundary section. One simple choice of dipoles to generate an approximation to such potential values on the boundary, and to generate the associated potential throughout a region, is one electric dipole near each boundary section with a moment perpendicular to the nearby boundary, and two magnetic dipoles near each boundary section with moments tangential to the nearby boundary. Three such dipole moments at each vertex are represented in FIG. 11, which represents 36 dipole moments and corresponding degrees of freedom.

At a frequency equal to zero, one pair of virtual dipoles—one inside and one outside the sphere—at the correct locations can be used to define the exact solution for the fields of this simple ideal case of a real dipole located outside of a polarizable sphere. But in more general cases, such as non-zero frequencies, non-spherical objects, and applied fields from sources more complex than point dipoles, the exact solution method of solving for the field resulting from a charged object outside of the shape does not apply and ay be difficult to implement even approximately, while the method of least action with basis functions defined with the help of virtual sources can be applied with good results.

Each basis function $a_i$ (resulting from a dipoles near the surface the object inside and outside of the object) described above is approximately continuous everywhere, and a linear combination $A=\Sigma_j a_j c_j$ of these basis functions satisfies the Euler-Lagrange equation at every non-boundary point for any set of parameter values $c_i$ for i≠0 and with $c_0=1$, but does not generally satisfy the Euler-Langrange equation at boundary points. As outlined earlier, values of the parameters $c_j$ in the linear combination of basis functions that form the parametized potential that extremizes the action by solving the matrix equation (XXX) for these parameters, thereby finding the linear combination that does the best possible job of satisfying the boundary conditions.

An Example of the Use of Matching Regions

Space has been divided into two regions for purposes computing the electromagnetic field in the above example. One region may be the interior of the sphere 804, and the other region may be everything outside of sphere 804. Other methods of defining basis functions may additionally divide either or both of two regions with homogeneous polarizability (the region inside and the region outside of an object) into two or more regions, so that there is no discontinuity in the properties of the medium at the boundaries between the adjacent regions. The additional boundaries may nevertheless be useful for defining practical and better-performing basis functions, as discussed next. The added regions, which may be chosen to be adjacent to or containing a physical boundary across which the polarizability is discontinuous, may be referred to as the "potential matching region" or just "matching region."

A potential matching region may be a thin region bounded on one side by the surface of discontinuity in polarizability (that is, the original sphere in this example), and by a nearby mathematically specified surface without any physical significant (such as a slightly larger sphere in this example). the added spherical surface will be referred to as the matching boundary or sphere, and the original the boundary or sphere will be referred to as the physical boundary or sphere. The thickness of the matching region may be chosen to be smaller than other relevant length scales, such as radius of curvature of the physical surface and distance over which applied fields change by an order of unity, but not very much smaller. In the example of this section, the matching sphere may be chosen to have a radius equal to 1.1 times the radius of the physical sphere.

With the help of the thin matching region formed by the physical sphere and the matching sphere, a set of basis functions can more easily be defined, such that every basis function is exactly effectively continuous at all points, as follows. One basis function $a_i$ may be defined in the region outside the matching boundary for each of the 36 virtual dipoles located inside the sphere, and for each of dipole, the basis function may be defined to be identically zero inside and on the physical boundary or sphere, and to vary (in a manner discussed below) from the value of the basis function at the matching boundary to the value of the basis function, at the physical boundary (which is zero), along a line perpendicular to either boundary. Then, one basis function $a_i$ may be defined in the region inside the physical boundary for each of the 36 virtual dipoles located outside the sphere, and for each of the 36 dipoles, the basis function is defined to be identically zero outside and on the matching boundary, and to again vary from its value at the physical boundary to the value of the basis function, zero, at the matching boundary, along a line perpendicular to either boundary.

Note that using the matching region requires twice as many basis functions as the method without a matching region, but there is no need to perform a separate calculation to make the potential continuous at the boundary, as described, when a matching region is not used.

Now, for each of the basis functions, the value of the basis function is specified at all boundary points of the matching region. In order to make the volume integrals negligible, in the matching region, each basis function satisfies the Euler-Lagrange equation to an acceptable approximation, as discussed in another section. In some cases, a simple linear function of distance from the boundary will approximately satisfy the Euler-Lagrange equation, resulting in volume integrals equal to zero; in other cases, a simple linear function is still practical to use even though the volume integrals may not be zero. If the boundary region is thin compared with the radius of curvature of the boundary, but not too thin, the volume integrals of the variation of the action in this boundary region will be small, easy to calculate approximately, and negligible if the spacing between dipoles is sufficiently small compared with the radius of curvature of the surface, and the boundary integrals over the physical and matching boundaries will generally be easy and fast to calculate within an acceptable approximation. The action can then be extremized after calculating the boundary integrals over the physical and matching boundaries. Although this method may require more boundary integrals and parameters, the potential is exactly continuous everywhere, and generally results in a solution that is numerically superior and easier to confidently analyze for errors and other characteristics.

Many variations of adding boundary regions are possible, such as defining boundary layers on both sides of a physical boundary describing media discontinuity.

Virtual Sources Other than Point Dipoles

Although point dipole virtual sources are very useful for representing and visualizing geometry, and have very simple and easily calculated potentials and fields, for smoother fields smoother virtual charge and current densities may be used instead of point dipoles. For example, each of the point dipoles may be replaced with a 2D virtual dipole density on the surface of the polyhedron with a unit density at one of the 12 vertices, a density of zero at all other vertices, and a density that varies linearly with position between the three vertices of each triangle. Dipole densities can be used in place of the point dipoles to define basis functions using any of the methods previously discussed.

Example of a 2D Simplex Mesh

Figure 12:
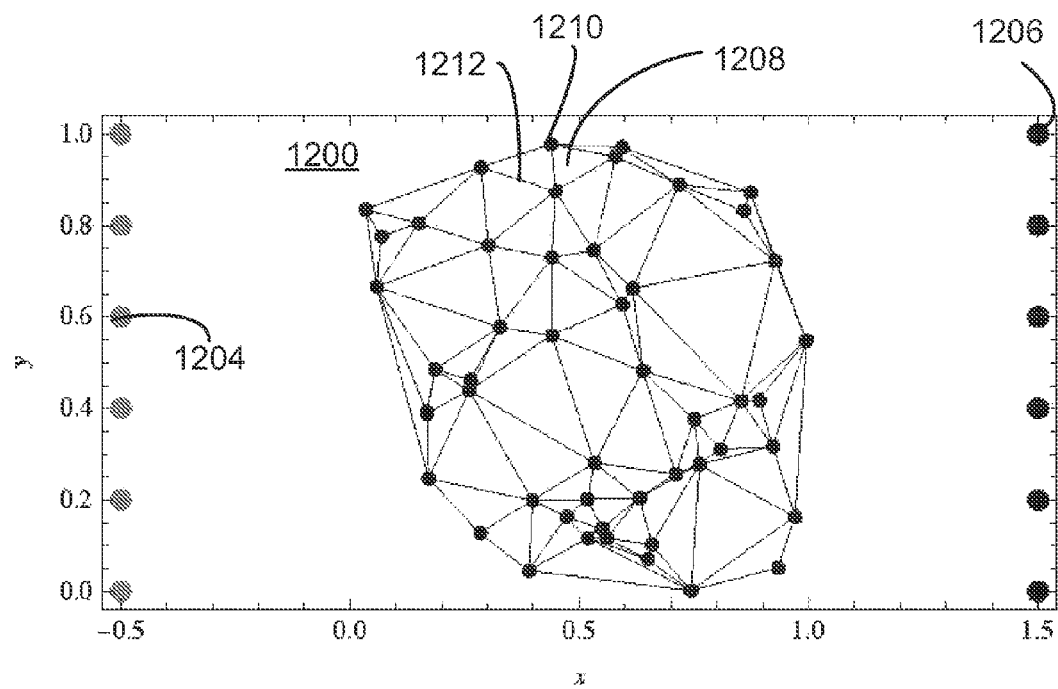
FIG. 12 shows an example of using a mesh of simplices for computing a field.

FIG. 12 shows an example 1200 of a mesh of simplices that may be used computing electromagnetic fields. Example 1200 includes wires 1204 and 1206, and simplices 1208 having nodes 1210 and boundaries 1212.

FIG. 12 shows a two-dimension problem, which was chosen because the situation of FIG. 12 can be graphically represented in 2D. FIG. 12 there is a metal object that varies the x and y directions (in the plane of the paper), and extends very far in the z direction (perpendicular to the paper) so that the situation may approximate a 2D problem, with all quantities independent of z and with harmonic dependence on time.

Wires 1204 have a current that travels out of the paper in the left (which are represented by large grey dots), wires 1206 have a current that travels into of the paper on the left (which are represented by large black dots). Wires 1204 and 1206 may represent a coil that is stretched in the z direction.

Computation of the resulting field may be performed on a mesh of simplices. Simplices 1208 are an example of a mesh of simplices that may be used from performing the field computations. Nodes 1210 are the vertexes of the simplices, and boundaries 1212 are the walls between the simplices (connecting the vertexes). The size of the simplices may be varied according to the amount of variation expected in a particular region. Areas with higher variation in the field may include a larger number of simplices, but the simplices will tend to me smaller than other areas, and areas with less variation in the fields may be have a smaller number of simplices, but the simplices will tend to be larger.

Such a problem can usefully model characteristics of a real 3D situation, but with much less computation. The equations are solved using integrals over the interior of each simplex 1208 and integrals over the boundaries 1212 of each simplex. As in FIG. 12, simplices need not be used throughout the entire region in which the field is being computed.

Other methods of defining computationally useful regions of space may also be used. For example, if the physical situation is symmetric with rotation about an axis, simplicies in a 2D half-plane bounded by the axis may be defined, and then 3D volumes of rotation may be defined and the 3D volumes may be associated with virtual sources by rotating the simplicies about the axis.

Treatment of Time Dependence

In an embodiment, the time dependence of the potential basis function (and therefore of the basis functions of the electromagnetic fields) in any particular chosen inertial reference frame may be assumed to be harmonic, so that, for example, the jth scalar potential basis function $\phi_j[r,t]$ (where the convention is used that function arguments are enclosed in square brackets) is represented by the complex quantity $\tilde{\phi}_j[r,\omega]e^{-i\omega t}$, and consequently time derivatives of the basis functions can be replaced by multiplication by $-i\omega$. In the remainder of the specification, the common convention of using a simple symbol, such as $\phi_j$, to represent either $\phi_j[r,t]$, $\tilde{\phi}_j[r,\omega]$, or $\tilde{\phi}_j[r,\omega]e^{-i\omega t}$, as implied by context may be used.

In an embodiment with non-harmonic charge-current source densities, non-harmonic charge-current densities may be written as sums of components varying harmonically at different frequencies and then solve for the fields for each frequency $\omega$, such as $\tilde{\phi}[r,\omega]=\Sigma_j\tilde{\phi}_j[r,\omega]c_j$ (there will generally be a different set of parameters $c_j$ for each frequency), and then form the time-dependent solution as an integral or sum, $$\phi[r,t]=\Sigma_\omega\tilde{\Phi}[r,\omega]e^{-i\omega t}.$$

The electric and magnetic fields associated with the above potential will have a corresponding time and frequency dependence. In general, a partial derivative with respect to time of a basis function can be replaced by a multiplication by $-i\omega$.

Treatment of Polarizable Regions

To choose basis functions such that any linear combination satisfies the Euler-Lagrange equation (Maxwell's inhomogeneous equations) in the interior of regions 502 and 504, for example, for polarizable media and some given charge density $\rho$ and current density J, for the basis functions with $i \neq 0$, it is generally required, $$\nabla \cdot d_i = 0,$$

$$\nabla \times h_i - \frac{\partial}{\partial t} d_i = 0,$$

and that for the basis functions with $i=0$, $$\nabla \cdot d_0 = \rho,$$

$$\nabla \times h_0 - \frac{\partial}{\partial t} d_0 = J,$$

Then, $\nabla \cdot D = \rho$ and $$\nabla \times H = \frac{\partial}{\partial t} D + J$$

are satisfied by $D = d_0 + \Sigma_{j \neq 0} d_j c_j$ and $H = h_0 + \Sigma_{j \neq 0} h_j c_j$ for any choice of parameters $c_j$, or equivalently, by $D = \Sigma d_j c_j$ and $H = \Sigma_j h_j c_j$ with $c_0 = 1$. In an embodiment, it is assumed that the time dependence of the fields is proportional to $e^{-i\omega t}$, in which case the above equations become, $\nabla \cdot d_i = 0$, $\nabla \times h_i + i\omega d_i = 0$, $\nabla \cdot d_0 = \rho$, $\nabla \times h_0 + i\omega d_i = J$ In an embodiment, within each computation cell the material properties (i.e., electric and magnetic polarizabilities) are homogeneous, though the charge and current densities $\rho$ and J are typically modeled by simple geometries such as point or line densities, at either boundary or non-boundary points. In an embodiment, the gauge freedom of the Euler-Lagrange equations may be used to require that the potential satisfies the Lorenz gauge condition.

Calculation of the potential A in the case of non-polarizable media (such as vacuum) is simple and outlined below, since the potential A serves as a foundation for finding the solution with polarizable media. For polarizable media, part or all of the charge $\rho$ and current J are due to the polarized media and are proportional to the derivative of the potential (i.e., the field $F = \nabla \wedge A$); the solution is not immediately obvious, and is treated after non-polarizable media.

In the simple case of non-polarizable media, G is equal to F so the Euler-Lagrange equation $\nabla \cdot G = J$ simplifies to $\nabla \cdot F = J$ and then inserting the definition of F this is $\nabla \cdot (\nabla \wedge A) = J$. If A is required to satisfy the Lorenz condition $\nabla \cdot A = 0$, this simplifies to $\nabla^2 A = J$ In terms of the equivalent time and 3D space differential operators, potentials, and charge-current sources, this is $$\left(\frac{1}{c^2}\partial_t^2 - \nabla^2\right)(\Phi - cA) = \rho - \frac{1}{c}J$$

For harmonic time dependence at frequency $\omega$, we replace each time derivative with $-i\omega$. The resulting equation is satisfied by parameterized complex scalar and complex 3D vector potentials $\Phi = \phi_0 + \Sigma_{j \neq 0} \phi_j c_j$ and $A = a_0 + \Sigma_{j \neq 0} a_j c_j$ for any choice of parameters $c_j$ if the basis potential functions satisfy $$\left(\frac{\omega^2}{c^2} + \nabla^2\right)\phi_j = 0,$$

$$\left(\frac{\omega^2}{c^2} + \nabla^2\right)\alpha_j = 0,$$

$$\left(\frac{\omega^2}{c^2} + \nabla^2\right)\phi_0 = \rho,$$

$$\left(\frac{\omega^2}{c^2} + \nabla^2\right)a_0 = J,$$

Examples of solutions to the first two equations above are plane waves, $\phi_j = \exp[ik_j \cdot r]$ and $a_j = \alpha_j \exp[ik_j \cdot r]$ where $\alpha_j$ (Greek alpha) is any vector perpendicular to the wavevector $k_j$ and the wavevector may have any direction but much have magnitude $|k_j| = \omega/c$. Examples of solutions to the second two equations for the case of charge and current source describing an oscillating point electric dipole located at $r=0$ and with electric dipole moment q are the usual expressions for the potentials due to an oscillating point electric dipole:

$$\phi_0 = \frac{q \cdot r}{r^2} e^{ik_j \cdot r}$$

$$a_0 = -\hat{q}\frac{i\omega}{c}\frac{q \cdot r}{r^2} e^{ik_j \cdot r}$$

The basis field functions are defined in terms of the potentials by $$d_i = \varepsilon_0\left(-\nabla \phi_i - \frac{\partial}{\partial t} a_i\right)$$

$$h_i = \frac{1}{\mu_0}\nabla \times a_i$$

These may be calculated numerically using numerical values of the potentials due to q, but it is often more computationally efficient to use Greens function integrals to find symbolic expressions for these fields in terms of the original charge-current densities, characterized by q in this example.

In an embodiment, in the above equations, $c_0$ may be set equal to 1.

A method of solving Maxwell's equations for A, F, and G in any a uniform linearly polarizable medium, given a specified source J is provided next. It is helpful to first review the following additional equations associated with fields in media.

The Euler-Lagrange equation in such a medium is $\nabla \cdot G = J$

The 4D space-time vector derivative operator $\nabla$ is related to the 3D space vector derivative operator $\overline{\nabla}$ defined in the rest frame of the medium with space-time velocity $\gamma_0$ by $$\nabla = \left(-\frac{i\omega}{c} - \nabla\right)\gamma_0,$$

and the space-time bivector displacement-magnetic field G is defined in terms of the space-time electromagnetic field F by $$G = (\in_m/\in_0)\gamma_0\gamma_0 \cdot F + (\mu_0/\mu_m)\gamma_0\gamma_0 \wedge F$$

where the space-time bivector electromagnetic field F is defined in terms of the space-time vector potential field A by $$F = \nabla \wedge A.$$

With these definitions, we see that the Euler-Lagrange equation is a second order differential equation for the potential A.

We may equivalently write $$G = \varepsilon_m E + \frac{1}{c} III \frac{1}{\mu_m} B$$

where we define the electric 3D space vector field $$E = (1/\in_0)\gamma_0\gamma_0 \cdot F$$

and the "magnetic intensity" 3D space vector field $$B = (\mu_0/c)\gamma_0\gamma_0 \wedge F$$

so that the bivector field F of 4D space-time may be expressed in terms of E and B as $$F = \varepsilon_0 E + \frac{1}{c} III \frac{1}{\mu_0} B.$$

The space-time vector charge-current source J is related to the 3D space scalar charge density ρ and vector current density J by $$J = \gamma_0\left(\rho - \frac{1}{c}J\right)$$

J is the charge-current source in the medium excluding any charge and current that is represented by the electric polarization P or magnetic polarization M, such as via the permittivity $\in_m$ and permeability $\mu_m$ of the medium m. The space-time vector potential A is related to the 3D space vector potential A and scalar potential Φ in a polarizable medium that is at rest in a frame with space-time velocity $\gamma_0$ by $$A = \left(\varepsilon_0 \Phi + \frac{1}{c} III \frac{1}{\mu_0} A\right)\gamma_0$$

The Lorenz condition may be written as $$0 = \nabla \cdot A$$

By virtue of the mathematical identity $\nabla \wedge \nabla \wedge A = 0$ for any function A, and the definition $F = \nabla \wedge A$, F identically satisfies $$\nabla \wedge F = 0$$

The differential equations $\nabla \cdot G = J$ and $\nabla \wedge F = 0$ together form the space-time expression of Maxwell's equations in linearly polarizable media. If the expressions for F and G in terms of E, B, D, and H are substituted into the above equations, the result is the more familiar expression of Maxwell's equations in linearly polarizable media using vector algebra. A method for easily solving these equations is given next.

Using $\in_m$, $\mu_m$, and $v_m = 1/\sqrt{\in_m \mu_m}$ to represent the permeability, permittivity, and phase velocity of light in a medium m, we define new "medium" quantities $\nabla_m$, $G_m$, $J_m$, and $A_m$, which implicitly depend on the space-time velocity $\gamma_0$ of the rest frame of the medium, according to the following equations. These are nearly identical to certain equations above but with the phase velocity c of light in vacuum replaced with the phase velocity $v_m$ of light in the medium m:

$$\nabla_m = \left(-\frac{i\omega}{v_m} - \nabla\right)\gamma_0$$

$$G_m = \varepsilon_m E + \frac{1}{v_m} III \frac{1}{\mu_m} B$$

$$J_m = \gamma_0\left(\rho - \frac{1}{v_m}J\right)$$

and $$A_m = \left(\varepsilon_0 \Phi + \frac{1}{v_m} III \frac{1}{\mu_0} A\right)\gamma_0$$

Note that although $\nabla_m$ does not have the physical interpretation of an operator that is invariant under Lorentz transformations, we can quite legitimately define it as an operator associated with the rest frame of the medium m that is identified by the space-time unit vector $\gamma_0$, and very usefully use the associated geometric algebra in the next step. The differential equations for G and for F can be rewritten in terms of these medium quantities as $$\nabla_m \cdot G_m = J_m$$

$$\nabla_m \wedge G_m = 0$$

Further, the medium electromagnetic field $G_m$ is related to the medium potential field $A_m$ by $$G_m = \nabla_m \wedge A_m$$

and the Lorenz condition may be written as $$0 = \nabla_m \cdot A_m$$

The two differential equations for $G_m$ can be added together to get the single vector derivative equation, $$\nabla_m G_m = J_m$$

Unlike the equations for G and F in polarizable media, the single vector derivative equation for $G_m$ can be easily inverted in geometric algebra to give $G_m$ as an integral function of the media source $J_m$ for an unbounded homogeneous 3D space volume:

$$G_m[r'] = \iiint g_m[r-r']J_m[r]d^3r$$

where the Green's function for the field $G_m$ is $$g_m[R] = \frac{1}{4\pi|R|^3}\text{Exp}[ik_m|R|](R + ik_m|R|(|R| - R))$$

with $$k_m = |\omega|/v_m$$

If $A_m$ satisfies the Lorenz condition, as we usually choose, then $G_m = \nabla_m A_m$ and the equation for $G_m$ can be written as the simple differential equation for $A_m$, $$\nabla_m^2 A_m = J_m$$

and therefore $A_m$ can also be easily calculated as an integral function any media source $J_m$, according to $$A_m[r'] = \iiint a_m[r-r']J_m[r]d^3r$$

where the Green's function for the field $A_m$ is $$a_m[R] = \frac{1}{4\pi|R|}\mathrm{Exp}[ik_m|R|]$$

(Note that this media Green's function $a_m[R]$, with a subscript indicating which medium m it is associated with, is not related to the potential basis functions $a_i$ with a subscript index i as used in other sections). These expressions can be applied to any particular source J, and the results, after expansion and expression using only vector dot and cross products, are identical to results obtained, generally at much greater length, using only vector algebra. Such results can be easily and practically used as the basis for numerical computation.

A procedure for calculating the potential A and fields F and G satisfying Maxwell's equations in a uniformly polarizable medium with specified charge-current J is therefore 1) Calculate $J_m$ from J (a trivial linear transformation),
2) Calculate $G_m$ and $A_m$ from $J_m$ at any desire point by using the integral expressions above,
3) Calculate G or F, as needed, from $G_m$, and A from $A_m$ (also trivial linear transformations).

Computations Including Conductive Materials

If some regions are filled with electrically conducting material, computational problems may arise due to the corresponding permittivity $\in$ being given by $\in = \in_0 + i\sigma/\omega$, where $\in_0$ is the permittivity of free space, $\sigma$ is the electrical conductivity and $\omega$ is the angular frequency. The problem arises because $\in$ diverges for small frequencies $\omega$. The equations for the solving for the least action may be modified to eliminate the problem arising from $\in$ diverging, as follows.

a) We use dn to represent the differential element of a boundary in an integral over the boundary, $\hat{n}$ to represent a unit vector normal to the boundary, and n to represent the collection of all boundary points. We classify all boundary points n to be in one of two mutually exclusive, exhaustive sets: points in $n^C$ which have conductors on at least one side of the boundary, and points in $n^N$ that do not have an electrical conductor on either side.

b) Next we choose the potential basis functions such that for each index i, the scalar potential basis function $\phi_i$ and the vector potential basis function $a_i$ may have nonzero values at boundary points either i) only for points of $n^C$ or ii) only for points of $n^N$. We let C be the set of index values i (the "Conductor index values") for the first of these two types of basis functions, and N be the set of index values i (the "Nonconductor index values") for the second of these two types of basis functions.

Then the general least action equation is indexed by i ranging over the union C+N=Q, the union of the conductor index values C and nonconductor index values N. We have previously written the general least action expression as a single equation indexed by i ranging over the complete set of index values Q, but now we write this as two separate equations, one for the conductor index values C and one for the nonconductor index values N:

$$\Sigma_{j=0}\int_n{}^C(\phi_i^*(\hat{n}\cdot\Delta d_j) - a_i^*\cdot(\hat{n}\times\Delta h_j))dn\ c_j = -\int_n{}^C(\phi_i^*(\hat{n}\cdot\Delta d_0 - \sigma) - a_i^*\cdot(\hat{n}\times h_0 - K))dn \text{ for all } i\in C$$

where $i \in C$ means i that are elements of C, and $$\Sigma_{j=0}\int_n{}^N(\phi_i^*(\hat{n}\cdot\Delta d_j) - a_i^*\cdot(\hat{n}\times\Delta h_j))dn\ c_j = -\int_n{}^N(\phi_i^*(\hat{n}\cdot\Delta d_0 - \sigma) - a_i^*\cdot(\hat{n}\times h_0 - K))dn \text{ for all } i\in N.$$

In the two above equations, it is legitimate to replace the integration over all boundaries n with integration over only boundaries $n^C$ for $i \in C$ and over only boundaries $n^N$ for $i \in N$, because in the first case the potential and therefore the integrand is zero at all points of $n^N$ and in the second case the potential and therefore the integrand is zero at all points of $n^C$.

Since the union of all of the equations for both the conductor boundaries and the nonconductor boundaries form a set of Q equations with Q unknowns, any equation may be multiplied by any constant and the solution is unchanged—except that the multiplication may improve or worsen some numerical problems. We take advantage of this by multiplying each equation that is indexed by $i \in C$ by the factor $-i\omega$, so that factor of $\in = \in_0 + i\sigma/\omega$ (which enters into the equation via the displacement $\vec{d}_j = \in \vec{e}_j$) does not diverge in conductors for small values of $\omega$, and thus allows the electromagnetic fields to be solved regardless of whether $\omega$ is large or small. The factor of $-i$ is not necessary, but allows the factor $-i\omega$ to be interpreted as a time derivative. Writing $-i\omega q$ as $\dot{q}$ for q equal to $d_j$, $h_j$, $\sigma$, or K, the least action equations become $$\Sigma_{j=0}\int_n{}^C(\phi_i^*(\hat{n}\cdot\Delta\dot{d}_j) - a_i^*\cdot(\hat{n}\times\Delta\dot{h}_j))dn\ c_j = -\int_n{}^C(\phi_i^*(\hat{n}\cdot\Delta\dot{d}_0 - \dot{\sigma}) - a_i^*\cdot(\hat{n}\times\Delta\dot{h}_0 - \dot{K}))dn \text{ for all } i\in C$$

and $$\Sigma_{j=0}\int_n{}^N(\phi_i^*(\hat{n}\cdot\Delta d_j) - a_i^*\cdot(\hat{n}\times\Delta h_j))dn\ c_j = -\int_n{}^N(\phi_i^*(\hat{n}\cdot\Delta d_0 - \sigma) - a_i^*\cdot(\hat{n}\times\Delta h_0 - K))dn \text{ for all } i\in N.$$

Note that the equations for $i \in C$ must be multiplied by $\omega$ to avoid divergence at zero frequency, while the equations for $i \in N$ must not be multiplied by $\omega$, to avoid becoming linearly dependent at zero frequency (in particular, reducing to 0=0); either of these can cause computational problems.

As with previous equations, these may be written using vector algebra, geometric algebra, tensor algebra, matrix algebra, or other mathematical systems or combinations of mathematical systems.

Electric current density J induced in electrical conductors may be modeled in this kind of problem as the derivative of the conductor's complex polarization, $J = \partial_t P$, with associated charge surface density $\sigma = \hat{n}\cdot P$.

Continuity Errors

The theory of the principle of least action requires that the potential is continuous at all points, including boundary points, and so computation by the method of least action of this invention is most easily analyzed for errors and understood if the potential is continuous at all points. But the potential may be discontinuous in at least two acceptable ways and the method still be useful. This is detailed below.

The first way that the potential may be discontinuous is that it may be "effectively continuous" although not continuous, where effectively continuous means that a gauge transformation can remove any discontinuity. Specifically, even after requiring the Lorenz condition, $0 = \nabla \cdot A$ in terms of space-time quantities (or $0 = (1/c)\partial_t \Phi + \nabla \cdot A$ in terms of 3D space quantities), for any solution $A = \gamma_0(\Phi - A)$ to these equations, $A' = A + \nabla\psi$ is also a solution if the scalar field $\psi$ satisfies $\nabla^2\psi = 0$ (or equivalently, in terms of 3D space quantities, at least for stationary media, $A' = A + \nabla\psi$ and $$\Phi' = \Phi = \frac{\partial\psi}{\partial t}$$

is also a solution if the scalar field ψ satisfies $$\nabla^2 \psi - \frac{\partial^2 \psi}{\partial t^2} = 0).$$

Since this is a 2nd order differential equation, the value of ψ is uniquely determined at every point of a 4D space-time volume, if either ψ or the directional derivative of ψ perpendicular to the boundary is specified on the 3D boundary of the 4D volume. We can therefore always choose such a field ψ to exactly cancel any discontinuity in the component of A perpendicular to any boundary in 4D space-time (or in terms of 3D space quantities, at least for stationary media, to exactly cancel any discontinuity in the component of A perpendicular to any boundary in 3D space). A potential that is continuous except for a discontinuous perpendicular vector part at a boundary is therefore effectively continuous and is not a problem.

The second way that a potential may be discontinuous is that it may be only approximately effectively continuous across a boundary, due to imperfect matching of basis potential values at all points on the boundary between the two adjacent regions in which the potential is defined. In this case we may choose the functions defined on the two sides of the boundary for each basis potential so that some measure of total error due to discontinuity across the boundary is minimized. One useful measure of dissimilarity between the values of basis potentials on side I of the boundary, $(\phi_i^I, a_i^I)$, and the values of basis potentials on side II of the boundary, $(\phi_i^{II}, a_i^{II})$, is the sum of the squared difference between scalar potentials and the squared difference between vector potentials (multiplied by appropriate physical constants):

$$\varepsilon_0^2 (\phi_i^I - \phi_i^{II})^2 + \frac{1}{c^2 \mu_0^2} (a_i^I - a_i^{II})^2$$

However, since the vector component perpendicular to the boundary does not need to be continuous as discussed above, a more useful expression for the error in basis function i at a point on the boundary due to discontinuity across the boundary may exclude this perpendicular vector component. A corresponding useful total measure of error due to discontinuity of the ith potential basis function is the integral over all boundary points n of this error:

$$\text{error}_i = \int_n \left( \varepsilon_n^2 (\phi_i^I - \phi_i^{II})^2 + \frac{1}{c^2 \mu_0^2} \left( (a_i^I - a_i^{II})^2 - (\hat{n} \cdot (a_i^I - a_i^{II}))^2 \right) \right) dn$$

This error expression can be used by choosing quantities that are used to define either or both $(\phi_i^I, a_i^I)$ and $(\phi_i^{II}, a_i^{II})$, such as virtual source amplitudes, such that error$_i$ is minimized. This may be done before the action is extremized. This error in continuity of a basis potential function at boundary points is independent of the results of extremizing the action.

Defining potentials so that they are naturally continuous at boundaries, such as by using boundary matching regions as described previously, has advantages of easier theoretical analysis, but potentials defined so that they are only approximately continuous at boundaries as outlined above may be simpler and faster to compute.

Applications

The system and method may be used to design the shape, placement, and materials for magnetic recording write heads, antenna, the core of a transformer, the core of electromagnets, permanent magnets, and/or electromagnets for generators, and/or transmission lines, electric conductors and electronic components in larger assemblies such as computers and cell phones, microwave devices, and optical devices, including optical and electro-optical integrated circuits.

Alternatives and Extensions

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A system comprising:
a processor system including one or more processors; and
a memory system including one or more non-transient storage media coupled to the processor system;
the memory system storing one or more machine instructions, which when invoked cause the processor system to implement a method comprising:
computing, by the processor system, numerical values for a set of parameters of a parameterized effectively continuous electromagnetic potential;
the computing being performed, by the processor system, at least extremizing an action integral within a predetermined tolerance for which a Lagrangian density contains terms for at least an electromagnetic field;
the extremizing being performed, by the machine, at least numerically solving a set of equations for the set of parameters; the set of equations being a set of equations that result from taking partial derivatives of the action integral with respect to the set of parameters; and
storing, at least temporarily, results of the extremizing in the memory system;
the potential being a linear function of the parameters, the linear function including at least a sum of products, each product being one parameter of the set of parameters times a potential basis function of a set of basis functions.

2. A system comprising:
a processor system including one or more processors; and
a memory system including one or more non-transient storage media coupled to the processor system;
the memory system storing one or more machine instructions, which when invoked cause the processor system to implement a method comprising:
computing, by the processor system, numerical values for a set of parameters of a parameterized effectively continuous electromagnetic potential;
the computing being performed, by the processor system, at least extremizing an action integral within a predetermined tolerance for which a Lagrangian density contains terms for at least an electromagnetic field;
the extremizing being performed, by the machine, at least numerically solving a set of equations for the set of parameters; the set of equations being a set of equations that result from taking partial derivatives of the action integral with respect to the set of parameters; and storing, at least temporarily, results of the extremizing in the memory system;
the electromagnetic displacement field
and magnetic field of the Lagrangian density are equal to or approximated by linear functions of the electric field, which is defined as a derivative of the potential, and
of the magnetic intensity, which is defined as a different derivative of the potential,
respectively.

3. A system comprising:
a processor system including one or more processors; and
a memory system including one or more non-transient storage media coupled to the processor system;
the memory system storing one or more machine instructions, which when invoked cause the processor system to implement a method comprising:
computing, by the processor system, numerical values for a set of parameters of a parameterized effectively continuous electromagnetic potential;
the computing being performed, by system, at least extremizing an action integral within a redetermined tolerance for which a Lagrangian density contains terms for at least an electromagnetic field;
the extremizing being performed, by the machine, at least numerically solving a set of equations for the set of parameters; the set of equations being a set of equations that result from taking partial derivatives of the action integral with respect to the set of parameters; and
storing, at least temporarily, results of the extremizing in the memory system;
the method being capable of handling electromagnetic displacement and magnetic fields that are nonlinear functions of the electric field and magnetic intensity, resulting in a set of nonlinear equations in the parameters; and
the numerical solving of the set of equations for the set of parameters of the potential.

4. A system comprising:
a processor system including one or more processors; and
a memory system including one or more non-transient storage media coupled to the processor system;
the memory system storing one or more machine instructions, which when invoked cause the processor system to implement a method comprising:
computing, by the processor system, numerical values for a set of parameters of a parameterized effectively continuous electromagnetic potential;
the computing being performed, by system, at least extremizing an action integral within a predetermined tolerance for which a Lagrangian density contains terms for at least an electromagnetic field;
the extremizing being performed, by the machine, at least numerically solving a set of equations for the set of parameters; the set of equations being a set of equations that result from taking partial derivatives of the action integral with respect to the set of parameters; and
storing, at least temporarily, results of the extremizing in the memory system;
the extremizing of the action being performed by solving a set of equations, each equation containing integrals over non-boundary points of a set of regions and integrals over boundary points between regions of the set of regions.

5. The system of claim 4, the action being an integral whose integrand is a sum of at least
(1) a product of at least
  (a) an electromagnetic field basis function and
  (b) a displacement-magnetic intensity field function and
(2) a product of at least
  (a) a potential basis function and
  (b) a charge-current density function.

6. The system of claim 4, the action integral having a region of integration that includes at least a polarizable medium, with polarizability that is either electric or magnetic or both; basis potential functions of the polarizable medium being products of a harmonic function of time and a function of spatial coordinates.

7. The system of claim 4, the action integral having a region of integration that includes at least a polarizable medium; the solving being performed in a rest frame of the polarizable medium.

8. The system of claim 4, the parameterized potential being chosen so that for any parameter values, volume integrals over an interior of at least one region being equal to zero within a predetermined acceptable tolerance.

9. A system comprising:
a processor system including one or more processors; and
a memory system including one or more non-transient storage media coupled to the processor system;
the memory system storing one or more machine instructions, which when invoked cause the processor system to implement a method comprising:
computing, by the processor system, numerical values for a set of parameters of a parameterized effectively continuous electromagnetic potential;
the computing being performed, by the processor system, at least extremizing an action integral within a predetermined tolerance for which a Lagrangian density contains terms for at least an electromagnetic field;
the extremizing being performed, by the machine, at least numerically solving a set of equations for the set of parameters; the set of equations being a set of equations that result from taking partial derivatives of the action integral with respect to the set of parameters; and
storing, at least temporarily, results of the extremizing in the memory system;
the solving of the set of equations including solving the set of equations in a plurality of regions, the potential being a combination of one or more basis potentials, with at least one basis function being defined in at least one region as a potential function of at least one or more virtual charge-current sources, the virtual charge-current source being located outside the region or of real charge-current sources located inside the region or of both.

10. A system comprising:
a processor system including one or more processors; and
a memory system including one or more non-transient storage media coupled to the processor system;
the memory system storing one or more machine instructions, which when invoked cause the processor system to implement a method comprising:
computing, by the processor system, numerical values for a set of parameters of a parameterized effectively continuous electromagnetic potential;
the computing being performed, by the processor system, at least extremizing an action integral within a predetermined tolerance for which a Lagrangian density contains terms for at least an electromagnetic field;
the extremizing being performed, by the machine, at least numerically solving a set of equations for the set of parameters; the set of equations being a set of equations that result from taking partial derivatives of the action integral with respect to the set of parameters; and storing, at least temporarily, results of the extremizing in the memory system;

the solving of the set of equations including solving the set of equations in a plurality of regions, such that one or more regions are simplices and the parameterized potential in one or more simplices exactly or approximately satisfies the Euler-Lagrange equations.

11. The system of claim 10, one or more of the potential functions being a linear function of position.

12. A system comprising:

a processor system including one or more processors; and a memory system including one or more non-transient storage media coupled to the processor system;

the memory system storing one or more machine instructions, which when invoked cause the processor system to implement a method comprising:

computing, by the processor system, numerical values for a set of parameters of a parameterized effectively continuous electromagnetic potential;

the computing being performed, by the processor system, at least extremizing an action integral within a predetermined tolerance for which a Lagrangian density contains terms for at least an electromagnetic field;

the extremizing being performed, by the machine, at least numerically solving a set of equations for the set of parameters; the set of equations being a set of equations that result from taking partial derivatives of the action integral with respect to the set of parameters; and storing, at least temporarily, results of the extremizing in the memory system;

with time variations of electromagnetic potentials, fields, and charge and current densities approximated as varying harmonically with time, and electrical conductivity represented by complex permittivity.

13. The system of claim 12, with the potential parameterized as a sum of parameters times basis functions, the basis potential functions including two types of basis functions, one type of basis function being zero within an acceptable tolerance at all boundary points for which an electrical conductor is on at least one side, and another type of basis function being zero within an acceptable tolerance at all boundary points for which an electrical conductor is not on any side.

14. The system of claim 13, in which the indexed equations that express variation of the action being equal to zero whose index corresponds to the first type of basis function, are multiplied by a factor equal to the frequency, and then symbolically simplified to eliminate factors that diverge for frequencies that go to zero, before computing a numerical solution to the set of equations.

15. A system comprising:

a processor system including one or more processors; and a memory system including one or more non-transient storage media coupled to the processor system;

the memory system storing one or more machine instructions, which when invoked cause the processor system to implement a method comprising:

computing, by the processor system, numerical values for a set of parameters of a parameterized effectively continuous electromagnetic potential;

the computing being performed, by the processor system, at least extremizing an action integral within a predetermined tolerance for which a Lagrangian density contains terms for at least an electromagnetic field;

the extremizing being performed, by the machine, at least numerically solving a set of equations for the set of parameters; the set of equations being a set of equations that result from taking partial derivatives of the action integral with respect to the set of parameters; and storing, at least temporarily, results of the extremizing in the memory system;

in which each basis potential function is chosen so that its effective discontinuity at boundary points is minimized though not necessarily zero.

16. A system comprising:

a processor system including one or more processors; and a memory system including one or more non-transient storage media coupled to the processor system;

the memory system storing one or more machine instructions, which when invoked cause the processor system to implement a method comprising:

computing, by the processor system, numerical values for a set of parameters of a parameterized effectively continuous electromagnetic potential;

the computing being performed by the processor system, at least extremizing an action integral within a predetermined tolerance for which a Lagrangian density contains terms for at least an electromagnetic field;

the extremizing being performed, by the machine, at least numerically solving a set of equations for the set of parameters; the set of equations being a set of equations that result from taking partial derivatives of the action integral with respect to the set of parameters; and storing, at least temporarily, results of the extremizing in the memory system;

in which space is made up of regions, each having uniform polarizability, separated by boundaries, and the basis functions are chosen so that they are continuous at all nonboundary points and effectively continuous at all boundary points for any parameter values, and the Euler-Lagrange equations are satisfied at all non-boundary points.

17. A system comprising:

a processor system including one or more processors; and a memory system including one or more non-transient storage media coupled to the processor system;

the memory system storing one or more machine instructions, which when invoked cause the processor system to implement a method comprising:

computing, by the processor system, numerical values for a set of parameters of a parameterized effectively continuous electromagnetic potential;

the computing being performed, by the processor system, at least extremizing an action integral within a predetermined tolerance for which a Lagrangian density contains terms for at least an electromagnetic field;

the extremizing being performed, by the machine, at least numerically solving a set of equations for the set of parameters; the set of equations being a set of equations that result from taking partial derivatives of the action integral with respect to the set of parameters; and storing, at least temporarily, results of the extremizing in the memory system;

the solving including solving the set of equations $$\frac{\partial}{\partial c_i} \int \left( \frac{1}{2} F \cdot G - A \cdot J \right) d\Omega = 0,$$

where $\int$ indicates to perform an integration, $\Omega$ is a four dimensional volume having three spatial dimensions and one time dimension over which the integration is performed, F is the electromagnetic field, G is the displacement-magnetic intensity field, A is the potential function, and J is the current-charge field and $c_i$ are the parameters of the potential A such that $A \approx \Sigma_i\, a_i c_i$, the field F such that $F \approx \Sigma_i\, f_i c_i$, and the field G such that $G \approx \Sigma_i\, g_i c_i$, where $a_i$, $f_i$, and $g_i$ are the basis functions of A, F, and G, respectively, such that $a_i$ is a continuous, but not necessarily differentiable, function of space-time position, $f_i$ is a function of space-time position given by $f_i = \nabla \wedge a_i$, and $g_i$ is a linear function of the field value $f_i$.

18. The system of claim 17, in which the set of equations may be written as a matrix equation $$M \cdot C = B$$

for an array C with elements equal to the unknowns $c_j$ for $j \neq 0$, where M is a matrix with elements $m_{i,j}$ for indices $i \neq 0$ and $j \neq 0$, and B is an array with elements $b_i$ for indices $i \neq 0$, given in terms of 4D space-time quantities by $$m_{i,j} = \int a_i \cdot \nabla \cdot g_j\, dv + \int a_i \cdot (\eta \cdot \Delta g_j)\, d\eta$$

$$b_i = -\int a_i \cdot (\nabla \cdot g_0 - J)\, dv - \int a_i \cdot (\eta \Delta g_0 - K)\, d\eta$$

in which the 4D volume integrals may equal zero or be negligible for some or all elements, in which case the associated elements are given by only boundary integrals in 4D space-time, $$m_{i,j} = \int a_i \cdot (\eta \cdot \Delta g_j)\, d\eta$$

$$b_i = -\int a_i \cdot (\eta \cdot \Delta g_0 - K)\, d\eta.$$

19. The system of claim 18, in which media is stationary in one inertial reference frame and time dependence is harmonic at frequency $\omega$ and the matrix and array elements may be given in terms of 3D space quantities by $$m_{i,j} = \int (\phi_i^*(\nabla \cdot d_j) - a_i^* \cdot (\nabla \times h_j + i\omega d_j))\, dV + \int (\phi_i^*(\hat{n} \cdot \Delta d_j) - a_i^* \cdot (\hat{n} \times \Delta h_j))\, dn$$

$$b_i = -\int (\phi_i^*(\nabla \cdot d_0 - \rho) - a_i^* \cdot (\nabla \times h_0 + i\omega d_0 - J))\, dV - \int (\phi_i^* (\hat{n} \cdot \Delta d_0 - \sigma) - a_i^* \cdot (\hat{n} \times \Delta h_0 - K))\, dn$$

in which the 3D volume integrals may equal zero or be negligible for some or all elements, in which case the associated elements are given by only boundary integrals in 3D space, $$m_{i,j} = \int (\phi_i^*(\hat{n} \cdot \Delta d_j) - a_i^* \cdot (\hat{n} \times \Delta h_j))\, dn$$

$$b_i = -\int (\phi_i^*(\hat{n} \cdot \Delta d_0 - \sigma) - a_i^* \cdot (\hat{n} \times \Delta h_0 - K))\, dn$$

where
$\Sigma_{j \neq 0}$ indicates to perform a summation over all values of indices j except j=0,
$\int$ indicates to perform an integration,
$\Phi_i$ is the ith scalar potential basis function
$\hat{n}$ is a unit vector normal to a boundary of computation cell
$\Delta d_j$ is a difference between the jth displacement basis function on a first side of the boundary and the jth displacement basis function on a second side of the boundary, the jth displacement basis function on the first side of the boundary being a displacement vector resulting from the jth scalar potential basis function and vector potential basis function on the first side of the boundary, and the jth displacement basis function on the second side of the boundary being a displacement vector resulting from the jth scalar potential basis function and vector potential basis function on the second side of the boundary,
$a_i$ is an ith vector potential basis function,
$\Delta h_j$ is a difference between the jth magnetic intensity basis function on the first side of the boundary and the jth magnetic intensity basis function on the second side of the boundary,
$\Delta d_j$ is a difference between the jth displacement basis function on one side of the boundary and the jth displacement basis function on another side of the boundary, the jth magnetic intensity basis function on the first side of the boundary being a magnetic intensity vector resulting from the jth vector potential basis function on the first side of the boundary, and the jth magnetic intensity basis function on the second side of the boundary being a magnetic intensity vector resulting from the jth vector potential basis function on the second side of the boundary,
dV indicates that the integration is over the boundary of the computation cell;
$c_j$ are the unknown parameters that are being solved for,
$\Delta d_0$ is a difference between the 0th displacement basis function on one side of the boundary and the 0th displacement basis function on another side of the boundary, the $0^{th}$ displacement basis function is a displacement function with a coefficient that has a known value,
$\Delta h_0$ is a difference between the 0th magnetic intensity basis function on one side of the boundary and the 0th magnetic intensity basis function on another side of the boundary, the 0th magnetic intensity basis function is a basis function with a known coefficient
$\rho$, J, $\sigma$, K are the known volume charge density, volume current density, surface charge density on a boundary, and surface current density on a boundary, respectively
$c_0$ is the coefficient that has the known value.

* * * * *